United States Patent
Kang et al.

(10) Patent No.: US 10,511,967 B2
(45) Date of Patent: Dec. 17, 2019

(54) METHOD FOR ESTABLISHING COMMUNICATION CONNECTION BETWEEN ELECTRONIC DEVICES AND ELECTRONIC DEVICE THEREFOR

(71) Applicant: Samsung Electronics Co., Ltd., Suwon-si, Gyeonggi-do (KR)

(72) Inventors: Ki Seok Kang, Pyeongtaek-si (KR); Hong Chan Park, Suwon-si (KR); Gi Beom Kim, Seongnam-si (KR); Sung Soo Park, Seoul (KR); Young Kow Lee, Suwon-si (KR); Hyuk Kang, Yongin-si (KR); In Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 15/252,787

(22) Filed: Aug. 31, 2016

(65) Prior Publication Data

US 2017/0134946 A1    May 11, 2017

(30) Foreign Application Priority Data

Nov. 10, 2015  (KR) .......................... 10-2015-0157125

(51) Int. Cl.
| H04W 12/06 | (2009.01) |
| H04L 29/06 | (2006.01) |
| H04W 76/14 | (2018.01) |
| H04W 88/04 | (2009.01) |
| H04W 88/06 | (2009.01) |
| H04W 12/00 | (2009.01) |

(52) U.S. Cl.
CPC .......... *H04W 12/06* (2013.01); *H04L 63/083* (2013.01); *H04L 63/0876* (2013.01); *H04L 63/205* (2013.01); *H04W 76/14* (2018.02); *H04W 12/00516* (2019.01); *H04W 88/04* (2013.01); *H04W 88/06* (2013.01)

(58) Field of Classification Search
CPC ... H04W 12/06; H04L 63/205; H04L 63/0876
USPC ......................................................... 726/7
See application file for complete search history.

(56) References Cited

U.S. PATENT DOCUMENTS

| 7,551,577 B2 | 6/2009 | McRae |
| 8,160,495 B2 | 4/2012 | Khedouri et al. |
| 8,700,739 B2 | 4/2014 | Khedouri et al. |
| 8,780,814 B2 | 7/2014 | Song et al. |

(Continued)

FOREIGN PATENT DOCUMENTS

KR    10-2010-0021690 A    2/2010

*Primary Examiner* — Teshome Hailu
(74) *Attorney, Agent, or Firm* — Jefferson IP Law, LLP

(57) ABSTRACT

An electronic device is provided. The electronic device includes at least one communication module and a processor configured to control the at least one communication module. The processor is configured to verify properties of at least one communication network accessed by the electronic device through the at least one communication module, to determine an authentication scheme to be applied to a communication connection between the electronic device and an external electronic device and to establish the communication connection such that the external electronic device accesses the at least one communication network through the electronic device based on the authentication scheme.

9 Claims, 14 Drawing Sheets

(56) References Cited

U.S. PATENT DOCUMENTS

| | | | |
|---|---|---|---|
| 9,081,781 B2 | 7/2015 | Khedouri et al. | |
| 9,161,219 B2 | 10/2015 | Bryksa et al. | |
| 9,307,565 B2 | 4/2016 | Song et al. | |
| 9,386,609 B2 | 7/2016 | Wang et al. | |
| 9,402,149 B2 | 7/2016 | Son et al. | |
| 9,426,649 B2* | 8/2016 | Sirotkin | H04W 12/04 |
| 9,571,503 B2* | 2/2017 | Choi | H04L 63/102 |
| 9,621,553 B1* | 4/2017 | Lee | H04L 63/20 |
| 2003/0139180 A1* | 7/2003 | McIntosh | H04L 63/0853 455/426.1 |
| 2006/0008256 A1 | 1/2006 | Khedouri et al. | |
| 2006/0101116 A1 | 5/2006 | Rittman et al. | |
| 2006/0221917 A1 | 10/2006 | McRae | |
| 2008/0046719 A1* | 2/2008 | Kim | H04L 63/205 713/156 |
| 2008/0155057 A1 | 6/2008 | Khedouri et al. | |
| 2008/0155109 A1 | 6/2008 | Khedouri et al. | |
| 2008/0155129 A1 | 6/2008 | Khedouri et al. | |
| 2008/0155470 A1 | 6/2008 | Khedouri et al. | |
| 2008/0155634 A1 | 6/2008 | Khedouri et al. | |
| 2008/0160910 A1 | 7/2008 | Khedouri et al. | |
| 2008/0176540 A1 | 7/2008 | Khedouri et al. | |
| 2008/0177860 A1 | 7/2008 | Khedouri et al. | |
| 2008/0178238 A1 | 7/2008 | Khedouri et al. | |
| 2008/0201375 A1 | 8/2008 | Khedouri et al. | |
| 2008/0201376 A1 | 8/2008 | Khedouri et al. | |
| 2008/0212944 A1 | 9/2008 | Khedouri et al. | |
| 2008/0212945 A1 | 9/2008 | Khedouri et al. | |
| 2008/0276303 A1* | 11/2008 | Gast | H04W 12/06 726/3 |
| 2008/0305738 A1 | 12/2008 | Khedouri et al. | |
| 2009/0252132 A1 | 10/2009 | Song et al. | |
| 2011/0009051 A1 | 1/2011 | Khedouri et al. | |
| 2011/0304685 A1 | 12/2011 | Khedouri et al. | |
| 2013/0347073 A1 | 12/2013 | Bryksa et al. | |
| 2014/0177833 A1* | 6/2014 | Helms | H04L 63/0428 380/201 |
| 2014/0267098 A1* | 9/2014 | Na | G06F 3/041 345/173 |
| 2014/0269512 A1 | 9/2014 | Koo | |
| 2015/0009016 A1 | 1/2015 | Dai | |
| 2015/0009919 A1 | 1/2015 | Song et al. | |
| 2015/0110014 A1 | 4/2015 | Wang et al. | |
| 2015/0156805 A1 | 6/2015 | Isenmann | |
| 2015/0304800 A1* | 10/2015 | Son | H04B 7/24 455/41.2 |
| 2016/0019475 A1 | 1/2016 | Bryksa et al. | |

* cited by examiner

METHOD FOR ESTABLISHING COMMUNICATION CONNECTION BETWEEN ELECTRONIC DEVICES AND ELECTRONIC DEVICE THEREFOR

CROSS-REFERENCE TO RELATED APPLICATION(S)

This application claims the benefit under 35 U.S.C. § 119(a) of a Korean patent application filed on Nov. 10, 2015 in the Korean Intellectual Property Office and assigned Serial number 10-2015-0157125, the entire disclosure of which is hereby incorporated by reference.

TECHNICAL FIELD

The present disclosure relates to a method for establishing a communication connection in an electronic device having a dual wireless-fidelity (Wi-Fi) communication module.

BACKGROUND

With the development of mobile communication technologies, electronic devices have changed into a form of being easily carried and being freely accessing wired and wireless networks. For example, portable electronic devices, such as smartphones and table personal computer (PCs), may support a variety of functions, such as an Internet connection, other than a telephony function and a message communication function.

Some of the above-mentioned portable electronic devices may be implemented to freely access various networks, for example, a cellular network to which a certain charging policy is applied, whereas the others may be implemented not to directly access the cellular network.

Therefore, the electronic device which may not access the cellular network directly may indirectly access the cellular network by establishing a communication connection (e.g., a device to device (D2D) connection) with the electronic device which may directly access the cellular network (e.g., tethering technologies).

If an external electronic device indirectly accesses the cellular network through tethering, data traffic of an electronic device which provides the tethering may be rapidly increased. In general, since a charging policy is established in the cellular network based on data traffic used by the electronic device, a user of the electronic device which provides the tethering should pay considerable communication charges.

Therefore, the electronic device which provides the tethering prevents an unintended increase in data traffic by requesting a device which receives the tethering to perform authentication.

With the development of tethering technologies, tethering based on a local-area communication network (e.g., a Wi-Fi network) as well as tethering based on the cellular network may be implemented. Therefore, in the electronic device which provides the tethering, there may be a need for presetting a scope for authentication, an authentication scheme, and an access range of a communication network according to the authentication, with respect to the electronic device which receives the tethering.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for determining an authentication scheme of an external electronic device (e.g., in which a device to device (D2D) connection is established) which receives tethering based on properties of a communication network, a method for determining a communication network to connect, based on the authentication scheme and the like of the external electronic device which receives the tethering, an electronic device for performing the methods, and a computer recording medium for performing the method.

In accordance with an aspect of the present disclosure, an electronic device is provided. The electronic device includes at least one communication module and a processor configured to control the at least one communication module. The processor is configured to verify properties of at least one communication network accessed by the electronic device through the at least one communication module, to determine an authentication scheme to be applied to a communication connection between the electronic device and an external electronic device, based on the properties, and to establish the communication connection such that the external electronic device accesses the at least one communication network through the electronic device based on the authentication scheme.

In accordance with another aspect of the present disclosure, an electronic device is provided. The electronic device includes at least one communication module configured to access a first communication network or a second communication network and a processor configured to control the at least one communication module. The processor is configured to verify an authentication scheme applied to a communication connection between the electronic device and an external electronic device or a relationship between the electronic device and the external electronic device, to select at least one of the first communication network or the second communication network based on the authentication scheme or the relationship, and to perform tethering for the external electronic device such that the external electronic device accesses the at least one selected communication network through the electronic device.

In accordance with another aspect of the present disclosure, a method for establishing a communication connection in an electronic device is provided. The method includes verifying properties of at least one communication network accessed by the electronic device, determining an authentication scheme to be applied to a communication connection between the electronic device and an external electronic device, based on the properties, and establishing the communication connection such that the external electronic device accesses the at least one communication network through the electronic device based on the authentication scheme.

In accordance with another aspect of the present disclosure, a method for establishing a communication connection in an electronic device is provided. The method includes verifying an authentication scheme applied to a communication connection between the electronic device and an external electronic device or a relationship between the electronic device and the external electronic device, selecting at least one of a first communication network or a second communication network based on the authentication scheme or the relationship, and performing tethering for the external electronic device such that the external electronic device accesses the at least one selected communication network through the electronic device.

In accordance with another aspect of the present disclosure, a non-transitory computer-readable recording medium is provided. The non-transitory computer-readable recording medium storing thereon instructions for, when executed by at least one processor, performing operations, the operations include verifying properties of at least one communication network accessed by an electronic device, determining an authentication scheme to be applied to a communication connection between the electronic device and an external electronic device, based on the properties, and establishing the communication connection such that the external electronic device accesses the at least one communication network through the electronic device based on the authentication scheme.

In accordance with another aspect of the present disclosure, a non-transitory computer-readable recording medium is provided. The non-transitory computer-readable recording medium storing thereon instructions for, when executed by at least one processor, performing operations, the operations include verifying an authentication scheme applied to a communication connection between an electronic device and an external electronic device or a relationship between the electronic device and the external electronic device, selecting at least one of the first communication network or the second communication network based on the authentication scheme or the relationship, and performing tethering for the external electronic device such that the external electronic device accesses the at least one selected communication network through the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
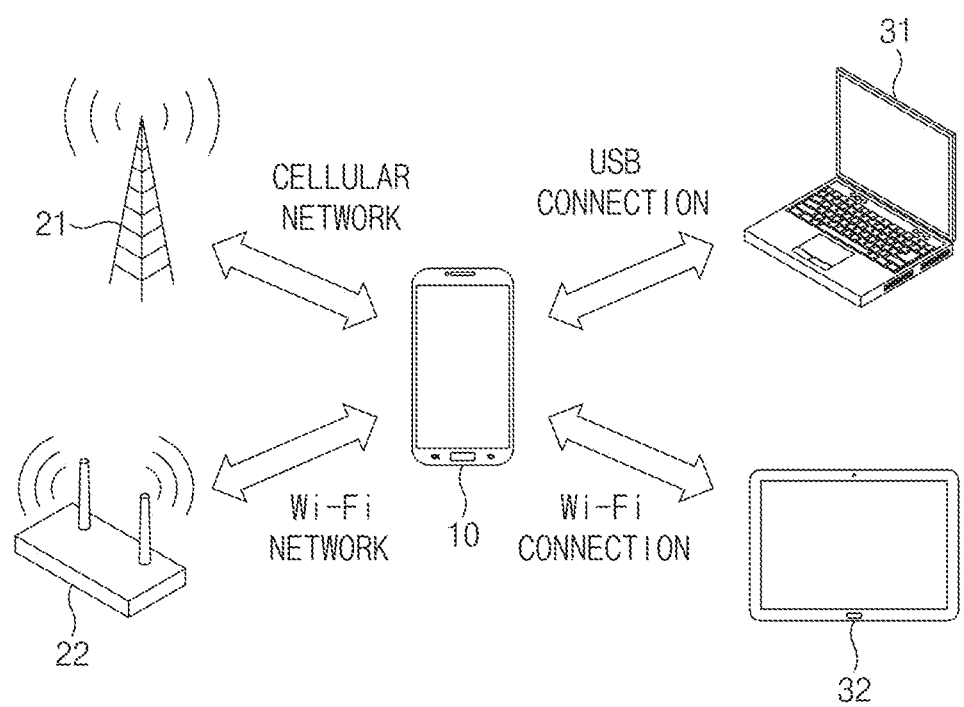
FIG. 1 is a drawing illustrating an environment implemented by an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element(s) (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hard wired. Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs which stores a dedicated processor (e.g., an embedded processor) for performing a corresponding operation.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude various embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™, game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a drawing illustrating an environment implemented by an embodiment of the present disclosure.

Referring to FIG. 1, an embodiment of the present disclosure is implemented with an electronic device 10, a base station (BS) 21, an access point (AP) 22, a first external electronic device 31, and a second external electronic device 32.

The electronic device 10 may be one of the above-mentioned various types of electronic devices. The electronic device 10 may be referred to as a user equipment (UE), terminal equipment, a mobile station (MhS), a mobile terminal (MT), a user terminal (UT), a subscriber station (SS), a wireless device, a handheld device, and the like in various ways.

The electronic device 10 may access a communication network by connecting with the BS 21 or the AP 22. For example, the electronic device 10 may access a cellular network (or mobile network) by connecting with the BS 21 and may access a Wi-Fi network by connecting with the AP 22. The electronic device 10 may connect to the Internet by accessing the cellular network or the Wi-Fi network.

The electronic device 10 may establish a communication connection with the first external electronic device 31 or the second external electronic device 32 (e.g., a device to device (D2D) connection or local-area communication). For example, the electronic device 10 may establish a wired universal serial bus (USB) connection with the first external electronic device 31 and may establish a wireless Wi-Fi connection with the second external electronic device 32. According to various embodiments, the communication connection (e.g., the D2D connection) is not limited to the wired USB connection or the wireless Wi-Fi connection. For example, the electronic device 10 may establish various wired/wireless D2D connections, such as a Bluetooth (BT) connection and a recommended standard 232 (RS-232) connection, with the first external electronic device 31 or the second external electronic device 32.

The electronic device 10 may provide or perform so-called tethering such that the first external electronic device 31 or the second external electronic device 32 may access a communication network (e.g., the cellular network or the Wi-Fi network) based on the various types of communication connections. The first external electronic device 31 or the second external electronic device 32 may access various communication networks through a communication network provided from the electronic device 10.

The BS 21 may provide the cellular network such that the electronic device 10 may access the Internet. The cellular network may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a communication protocol.

The BS 20 may be referred to as, for example, an advanced BS (ABS), a node-B (NB), an evolved-NB (eNB), a base transceiver system (BTS), a processing server (PS), and the like in various ways based on a used communication protocol.

The AP 22 may provide, for example, the Wi-Fi network such that the electronic device 10 may access the Internet. For example, the Wi-Fi network by the AP 22 may connect to the Internet through a wired communication network. The AP 22 may be configured such that a plurality of unspecified external devices may use the Wi-Fi network (i.e., such that the plurality of unspecified external devices may be public or open), based on a security policy or may be configured such that only an external device through specified authentication may use the Wi-Fi network. The AP 22 required for the specified authentication may include, for example, a home AP, an AP operated by a network operator, an AP operated by an enterprise, and the like.

Each of the first external electronic device 31 and the second external electronic device 32 may include, for example, a similar configuration to the electronic device 10. Herein, each of the first external electronic device 31 and the second external electronic device 32 may not access the cellular network by the BS 21 or the Wi-Fi network by the AP directly.

For one example, the first external electronic device 31 and the second external electronic device 32 may not have a cellular communication module for accessing the BS 21. For another example, the first external electronic device 31 and the second external electronic device 32 may not be granted authentication and access based on a security policy of the AP 22.

In the above-mentioned environment, the electronic device 10 according to an embodiment of the present disclosure may include components of FIG. 2 described below. Meanwhile, in this specification, various embodiments of the present disclosure are exemplified as the communication network accessible by the electronic device 10 is the cellular network (e.g., a first communication network) and the Wi-Fi network (e.g., a second communication network). However, various embodiments of the present disclosure are not limited thereto. For example, the communication network accessible by the electronic device 10 may include a network by BT communication or NFC as the second communication network rather than the Wi-Fi network.

Figure 2:
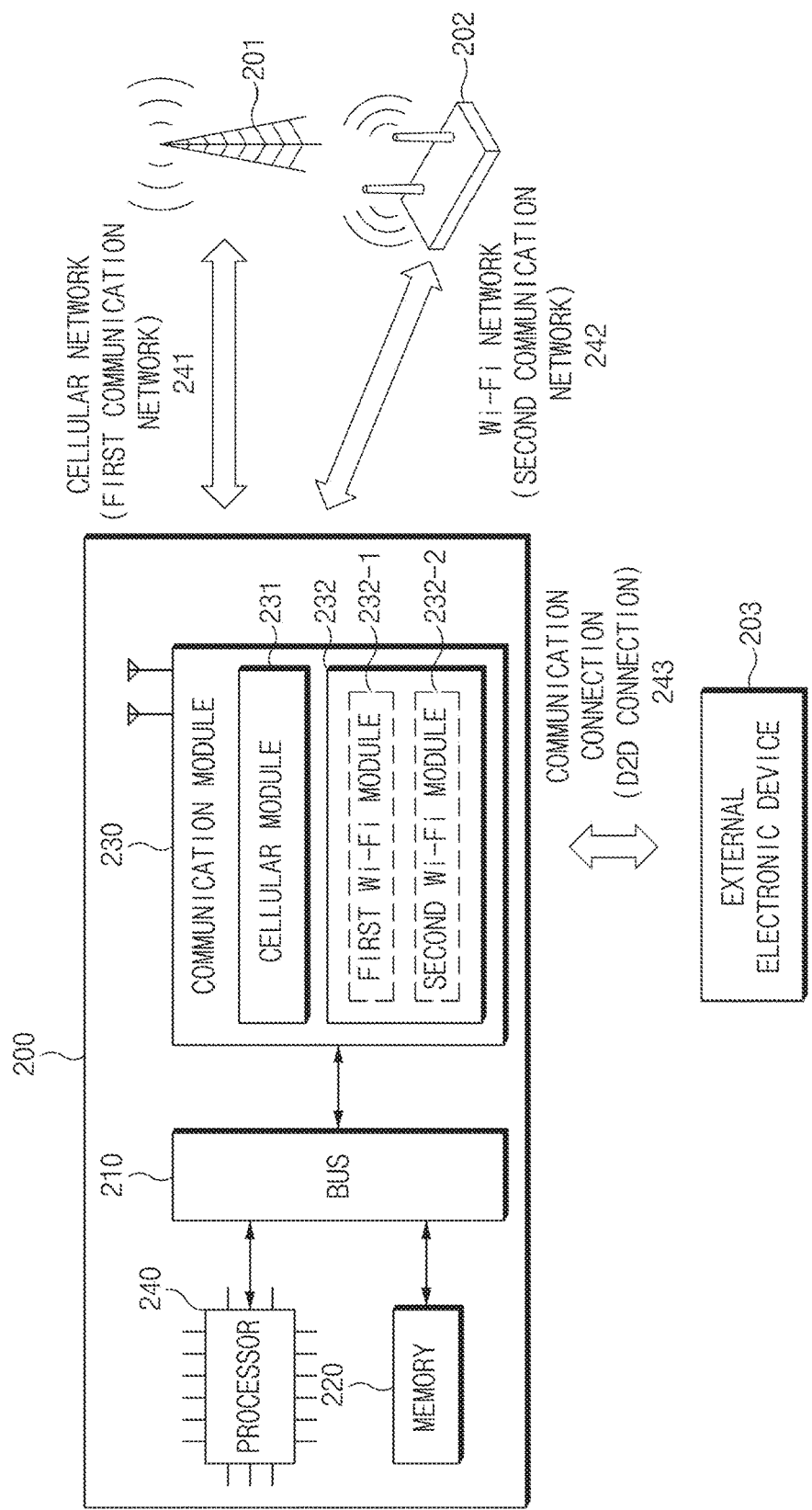
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 200 may correspond to, for example, an electronic device 10 of FIG. 1. A BS 201 may correspond to a BS 21 of FIG. 1, and an AP 202 may correspond to an AP 22 of FIG. 1. An external electronic device 203 may correspond to one of a first external electronic device 31 and a second external electronic device 32 of FIG. 1.

The electronic device 200 may include a bus 210, a memory 220, a communication module 230, and a processor 240. According to various embodiments, the electronic device 200 may additionally include various modules which are not illustrated in FIG. 2 (refer to FIG. 8 or 10).

The bus 210 may include a circuit which connects components 220 to 240 with each other and sends a communication message (e.g., a control message and/or data) between the components 220 to 240.

The memory 220 may include, for example, a volatile and/or non-volatile memory. The memory 220 may store a command or data associated with at least another of the components of the electronic device 200. For example, the memory 220 may store various instructions, when executed, including operations performed by the processor 240. Operations performed by the processor 240 based on the instructions will be described below.

According to an embodiment, the memory 220 may store information indicating a relationship between the electronic device 200 and the external electronic device 203. For example, the memory 220 may store a variety of device identification information such as a media access control (MAC) address, a static internet protocol (IP) address, a BT address, and an international mobile equipment identity (IMEI) of the external electronic device 203 accessed through a communication connection (e.g., a D2D connection). The relationship between the electronic device 200 and the external electronic device 203 may be defined based on the various device identification information (See, Table 1).

TABLE 1

| Device identification information | | Relationship with electronic |
|---|---|---|
| Type | Identification number | device 200 |
| MAC address | 08:EE:8A:0D:55:E2 | Tablet PC of the same owner |
| MAC address | 07:EA:9D:7E:E7:FF | Laptop PC of the same owner |
| IMEI | 643213684468713 | Smartphone of friend A |

For example, as shown in Table 1, the memory 220 may previously store information indicating the relationship between the electronic device 200 and the external electronic device 203. For example, an electronic device, a MAC address of which is "08:EE:8A:0D:55:E2", may be registered as a tablet PC of the same owner as the electronic device 200. Also, an electronic device, a MAC address of which is "07:EA:9D:7E:E7:FF", may be registered as a laptop PC of the same owner as the electronic device 200.

An electronic device, an IMEI of which is "643213684468713", may be registered as a smartphone of a friend of a user of the electronic device 200. The processor 240 of the electronic device 200 may determine (or select) a communication network to be granted access to the corresponding external electronic device 203, based on the at least one relationship.

According to an embodiment, the communication module 230 may communicate with each of the BS 201, the AP 202, and/or the external electronic device 203 under corresponding protocol. For example, the communication module 230 may access a cellular network (or mobile network) 241 (e.g., a first communication network) through the BS 201 and may access a Wi-Fi network 242 (e.g., a second communication network) 242, independent of the cellular network, through the AP 202. A module for accessing the at least one communication network (e.g., the first communication network or the second communication network) may be referred to as, for example, a first communication module.

According to an embodiment, the embodiment of the present disclosure is exemplified as the first communication network corresponds to the cellular network 241 and the second communication network corresponds to the Wi-Fi network 242. However, according to various embodiments, the first communication network and/or the second communication network may include at least one of various types of wired communication networks or various types of local-area communication networks. For example, the first communication network may include a network to which a charging policy based on data traffic is applied. Also, for example, the second communication network may include a network to which the charging policy based on data traffic is not applied and to which a charging policy based on a stipulated period of time is applied.

Also, according to an embodiment, the communication module 230 may establish a communication connection (e.g., a D2D connection 243) with the external electronic device 203. For example, the communication connection (e.g., the D2D connection 243) may include various wired/wireless communication connections such as a Wi-Fi connection, a BT connection, a USB connection, an RS-232 connection. For example, a module for establishing the communication connection between the external electronic device 203 and the electronic device 200 may be referred to as a second communication module.

For example, the communication module 230 (e.g., a communication network controller) included in the electronic device 200 may form a (tethering) communication network and may establish a communication connection with at least one external electronic device (e.g., the external electronic device 203). In this case, the communication module 230 may use, for example, the second communication module (e.g., a second Wi-Fi module 232-2), different from the first communication module (e.g., a cellular module 231 or a first Wi-Fi module 232-1), for establishing the communication connection.

Also, according to an embodiment, a relay device for supporting the communication connection (e.g., the D2D connection 243) may be arranged between the electronic device 200 and the external electronic device 203. For example, the communication module 230 of the electronic device 200 may provide tethering such that the external electronic device 203 may access the first communication network (e.g., the cellular network 241) or the second communication network (e.g., the Wi-Fi network 242) based on the communication connection supported by the relay device. For example, the electronic device 200 may establish a D2D connection with the relay device, and the external electronic device 203 may establish a D2D connection with the relay device.

According to various embodiments, there may be a plurality of relay devices. For example, the external electronic device 203 may access the first communication network (e.g., the cellular network 241) or the second communication network (e.g., the Wi-Fi network 242) through the plurality of relay devices and the electronic device 200.

According to various embodiments, the communication module 230 may include at least one communication module, for example, the cellular module 231 and a Wi-Fi module 232. The communication module 230 may additionally include, for example, various components, such as a radio frequency (RF) module (not shown), an oscillator (not shown), an antenna (not shown), and a driver (not shown), for providing a communication function. Also, in FIG. 2, an embodiment of the present disclosure is exemplified as the one communication module 230. However, various embodiments of the present disclosure are not limited thereto. According to various embodiments, a plurality of communication modules may be included in the electronic device 200.

The cellular module 231 (an example of the first communication module) may access the cellular network 241 by the BS 201. The cellular network 241 may use, for example, at least one of LTE, LTE-A, CDMA, WCDMA, UMTS, WiBro, or GSM, and the like as a cellular communication protocol. For example, the cellular module 231 may identify and authenticate the electronic device 200 using a subscriber identification module (SIM) (e.g., a SIM card or a universal SIM (USIM) card) which is not shown in FIG. 2. Information for identifying and authenticating the electronic device 200 may include international mobile subscriber identity (IMSI) information or globally unique temporary identifier (GUTI) information.

The Wi-Fi module 232 may include the first Wi-Fi (communication) module 232-1 or the second Wi-Fi (communication) module 232-2. For example, the first Wi-Fi module 232-1 (an example of the first communication module) may access the Wi-Fi network 242 by the AP 202. Also, for example, the second Wi-Fi module 232-2 (an example of the second communication module) may establish the communication connection (e.g., the D2D connection 243) with the external electronic device 203.

According to an embodiment, as such, the Wi-Fi module 232 including the first Wi-Fi module 232-1 and the second Wi-Fi module 232-2 may be referred to as a dual Wi-Fi module. The first Wi-Fi module 232-1 and the second Wi-Fi module 232-1 included in the Wi-Fi module 232 may correspond to operatively divided components. Therefore, for example, some or all of components of the first Wi-Fi module 232-1 and the second Wi-Fi module 232-2 may be implemented with one module.

The processor 240 may include, for example, a communication processor (CP) or an AP. The processor 240 may control the at least one communication module 230. According to various embodiments, at least part of the processor 240 may be implemented with a controller (not shown) embedded in the communication module 230.

According to various embodiments, the processor 240 may verify properties of the connection network (e.g., the cellular network 241 or the Wi-Fi network 242) accessed through the communication module 230.

According to an embodiment, the processor 240 may verify properties of the communication network accessed through the at least one communication module 230. The properties of the communication network may include, for example, a type (e.g., whether the communication network is the cellular network 241 or the Wi-Fi network 242), a charging policy, a data rate, an authentication scheme, or a network operator (e.g., a mobile network operator (MNO)) of the communication network, or their combinations.

The processor 240 may determine an authentication scheme to be applied to the communication connection (e.g., the D2D connection 243) between the electronic device 200 and the external electronic device 203, based on the verified properties. Next, the processor 240 may establish the communication connection (e.g., the D2D connection 243) such that the external electronic device 203 may access the at least one communication network (e.g., the cellular network 241 and the Wi-Fi network 242) through the electronic device 200 based on the determined authentication scheme.

For one example, if the at least one accessed communication network corresponds to the cellular network 241, the processor 240 may determine to apply a specified authentication scheme to the communication connection (e.g., the D2D connection 243).

The specified authentication scheme may include various authentication schemes, for example, a MAC authentication scheme, wired equivalent privacy (WEP), Wi-Fi protected access (WPA), WPA2-preshared key (PSK), extensible authentication protocol (EAP), and captive portable. For example, the EAP may include EAP-message digest 5 (MD5), EAP-transport layer security (TLS), EAP-tunneled TLS (TTLS), lightweight EAP (LEAP), EAP-flexible authentication via secure tunneling (FAST), and protected EAP (PEAP).

If the electronic device 200 accesses the cellular network 241 and if the external electronic device 203 indirectly accesses the cellular network 241 through the communication connection (e.g., the D2D connection 243), data traffic of the electronic device 200 may be rapidly increased. Therefore, the processor 240 of the electronic device 200 may prevent an unauthenticated external electronic device from using data by applying the specified authentication scheme to the communication connection (e.g., the D2D connection 243).

For another example, the electronic device 200 may access a public (or open) communication network (e.g., the Wi-Fi network 242). If an authentication scheme of the communication network is "public or open", the processor 240 may determine an authentication scheme of the communication connection (e.g., the D2D connection 243) as "public or open". The public or open communication network may be, for example, a network to which an authentication scheme is not applied and may correspond to a network to which a charging policy based on data traffic is not applied.

If the electronic device 200 accesses the public or open communication network, it may be safe for the external electronic device 203 to access the public or open communication network through the communication connection (e.g., the D2D connection 243). Therefore, the processor 240 of the electronic device 200 may determine an authentication scheme of the communication connection with the external electronic device 203 as "public or open".

For another example, the electronic device 200 may access a communication network to which a certain authentication scheme (e.g., a first specified authentication scheme) is applied. The certain authentication scheme (e.g., the first specified authentication scheme) may be applied to, for example, the communication network based on a charging policy or a security policy. For example, the communication network to which the certain authentication scheme is applied may correspond to a Wi-Fi network to which EAP/SIM or EAP/authentication and key agreement (AKA) provided from a mobile communication service provider is applied, may correspond to a Wi-Fi network (or a wired communication network) to which the captive portal provided from a service provider of an enterprise, a hotel, or an airport is applied, or may correspond to a Wi-Fi network to which the WPA2-PSK provided from a café or a person is applied.

The electronic device 200 may provide access to the communication network to which the certain authentication scheme (e.g., the first specified authentication scheme) is applied, to the external electronic device 203 through the communication connection (e.g., the D2D connection 243). In this case, the processor 240 of the electronic device 200 may apply an authentication scheme (e.g., a second specified authentication scheme), corresponding to the certain authentication scheme (e.g., the first specified authentication scheme), to the communication connection (e.g., the D2D connection 243).

For example, if the electronic device 200 accesses the Wi-Fi network 242 to which the WPA2-PSK (e.g., the first specified authentication scheme) is applied, the processor 240 of the electronic device 200 may apply the WPA2-PSK (e.g., the second specified authentication scheme) to the D2D connection 243. Alternatively, for example, if the electronic device 200 accesses the Wi-Fi network 242 to which the EAP/AKA (e.g., the first specified authentication scheme) is applied, the processor 240 of the electronic device 200 may apply local captive portal (e.g., the second specified authentication scheme) to the D2D connection 243.

A corresponding relationship between the authentication scheme of the communication network and the authentication scheme of the D2D connection 243 may be previously defined in, for example, the memory 220. The corresponding relationship may be freely corrected or changed by a user of the electronic device 200. For example, each of the first specified authentication scheme or the second specified authentication scheme may include the MAC authentication scheme, the WEP, the WPA, the WPA2-PSK, the EAP, the captive portal, or their combinations.

Meanwhile, according to an embodiment, the processor 240 may establish the communication connection (e.g., the D2D connection 243) between the electronic device 200 and the external electronic device 203, using the at least one communication module 230.

According to an embodiment, the processor 240 may verify an authentication scheme, applied to the communication connection (e.g., the D2D connection 243) between the electronic device 200 and the external electronic device 203, or a relationship between the electronic device 200 and the external electronic device 203. The processor 240 may verify the authentication scheme or the relationship in response to a connection request received from the external electronic device 203.

According to an embodiment, the processor 240 may select at least one of the first communication network (e.g., the cellular network 241) or the second communication network (e.g., the Wi-Fi network 242) based on at least one of the verified authentication scheme or the verified relationship. Subsequently, the processor 240 may perform tethering for the external electronic device 203 such that the external electronic device 203 may access the at least one selected communication network through the electronic device 200.

For example, if the authentication scheme of the communication connection (e.g., the D2D connection 243) is "public or open", the processor 240 may select the second communication network (e.g., the Wi-Fi network 242). The external electronic device 203 may access the second communication network (e.g., the Wi-Fi network 242) through the communication connection (e.g., the D2D connection 243). In other words, the external electronic device 203 may access the second communication network (e.g., the Wi-Fi network 242) to which a charging policy based on data traffic is not applied, through the public or open communication connection.

For another example, if the specified authentication scheme is applied to the communication connection (e.g., the D2D connection 243), the processor 240 may select the first communication network (e.g., the cellular network 241) and/or the second communication network (e.g., the Wi-Fi network 242). The external electronic device 203 may access the first communication network (e.g., the cellular network 241) and/or the second communication network (e.g., the Wi-Fi network 242) through the communication connection (e.g., the D2D connection 243). In other words, since the external electronic device 203 may access the electronic device 200 through the communication connection to which the specified authentication scheme is applied, external electronic device 203 may access the cellular network 241 and/or the Wi-Fi network 242.

The specified authentication scheme may include, for example, various authentication schemes, for example, the MAC authentication scheme, the WEP, the WPA, the WPA2-PSK, the EAP, or the captive portal. For example, the EAP may include the EAP-MD5, the EAP-TLS, the EAP-TTLS, the LEAP, the EAP-FAST, and the PEAP For another example, if the external electronic device 203 has a specified relationship (refer to Table 1) with the electronic device 200, the processor 240 may select the first communication network (e.g., the cellular network 241) and/or the second communication network (e.g., the Wi-Fi network 242). The external electronic device 203 may access the first communication network (e.g., the cellular network 241) and/or the second communication network (e.g., the Wi-Fi network 242) through the communication connection (e.g., the D2D connection 243).

For example, referring to Table 1, if determining that a MAC address of the external electronic device 203 is "07:EA:9D:7E:E7:FF", the processor 240 of the electronic device 200 may recognize the corresponding external electronic device 203 as a laptop PC of the same user as the electronic device 200. Therefore, the electronic device 200 may permit the external electronic device 203 to access the cellular network 241 or the Wi-Fi network 242 through the D2D connection 243.

In contrast, for example, if the external electronic device 203 does not have the specified relationship with the electronic device 200, the processor 240 may select the second communication network (e.g., the Wi-Fi network 242). The external electronic device 203 may access the second communication network (e.g., the Wi-Fi network 242) through the communication connection (e.g., the D2D connection).

For example, if device identification information of the external electronic device 203 is not registered in Table 1, the electronic device 200 may permit the external electronic device 203 accessed through the D2D connection 243 to access the Wi-Fi network 242. In other words, the external electronic device 203 which does not have the specified relationship may not access the cellular network 241 to which the charging policy based on data traffic is applied.

According to various embodiments, the processor 240 may provide a user interface (UI) for notifying the user of at least one communication network (determined to be granted access to the external electronic device 203). For example, the processor 240 may provide a communication network, determined to be accessed based on the above-mentioned various embodiments, to the user through a specified UI. The processor 240 of the electronic device 200 may permit the external electronic device 203 to access a communication network based on an input received through the specified UI.

Figure 3:
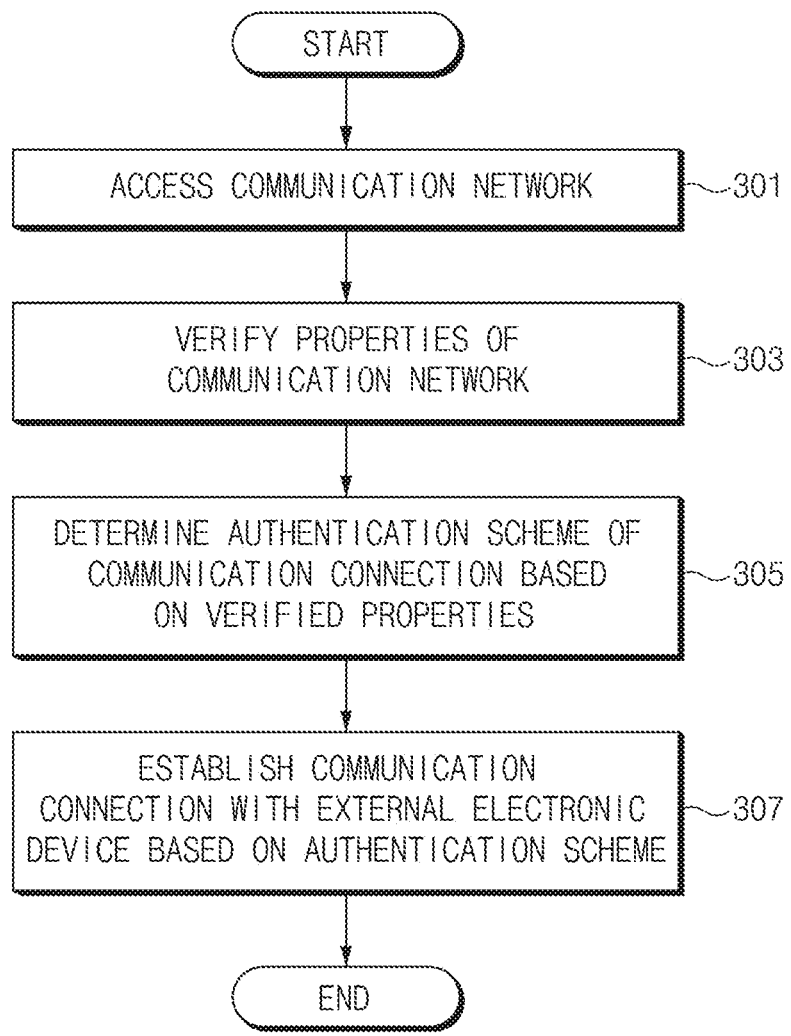
FIG. 3 is a flowchart illustrating a method for establishing a communication connection according to an embodiment of the present disclosure.

FIG. 3 is a flowchart illustrating a method for establishing a communication connection according to an embodiment of the present disclosure.

Referring to FIG. 3, the method for establishing the communication connection according to an embodiment may include operations 301 to 307. Operations 301 to 307 of the method for establishing the communication connection may be implemented with instructions executable by at least one processor (e.g., a processor 240 of FIG. 2). The implemented instructions may be stored in a computer-readable recording medium or a memory (e.g., a memory 220 of FIG. 2). Operations 301 to 307 of FIG. 3 are described using reference denotations of FIG. 2, and a repeated description will be omitted below.

In operation 301, for example, an electronic device 200 of FIG. 2 (e.g., the processor 240) may access a communication network (a cellular network 241 or a Wi-Fi network 242 of FIG. 2) using at least one communication module 230 of FIG. 2.

In operation 303, for example, the electronic device 200 (e.g., the processor 240) may verify properties of the at least one communication network accessed in operation 301. The properties may include, for example, at least one of a type, a charging policy, a data rate, an authentication scheme, or a network operator of the communication network.

In operation 305, for example, the electronic device 200 (e.g., the processor 240) may determine an authentication scheme to be applied to a communication connection (e.g., a D2D connection 243 of FIG. 2) between the electronic device 200 and an external electronic device 203 of FIG. 2, based on the properties of the communication network verified in operation 303.

For one example, if the type of the communication network accessed in operation 301 corresponds to the cellular network 241, the processor 240 may determine to apply a specified authentication scheme to the communication connection (e.g., the D2D connection 243). The specified authentication scheme may include, for example, at least one of a MAC authentication scheme, WEP, WPA, WPA2-PSK, EAP, or (local) captive portal.

For another example, if a first specified authentication scheme is applied to the communication network accessed in operation 301, the processor 240 may determine to a second specified authentication scheme, corresponding to the first specified authentication scheme, to the communication network (e.g., the D2D connection 243). The first specified authentication scheme and the second specified authentication scheme corresponding to the first specified authentication scheme may be determined based on, for example, a certain corresponding Table. The corresponding Table may be freely corrected or changed by a user of the electronic device 200. For example, the first specified authentication scheme and/or the second specified authentication scheme may include at least one of the MAC authentication scheme, the WEP, the WPA, the WPA2-PSK, the EAP, or the (local) captive portal.

For another example, if the authentication scheme of the communication network accessed in operation 301 is "public or open", the processor 240 may determine an authentication scheme of the communication network (e.g., the D2D connection 243) to "public or open".

In operation 307, for example, the electronic device 200 (e.g., the processor 240) may establish a communication connection with the external electronic device 203 such that the external electronic device 203 may access the at least one communication network (e.g., the communication network accessed by the electronic device 200 in operation 301) through the electronic device 200 based on the authentication scheme determined in operation 305.

For example, the communication connection may include at least one of a local-area wireless communication connection or a wired communication connection. The communication connection may include various wired/wireless D2D connections such as a Wi-Fi connection, a BT connection, a USB connection, and an RS-232 connection.

Meanwhile, according to various embodiments, the processor 240 may provide a UI, for notifying the user of an authentication scheme used for a communication connection with the external electronic device 203, to him or her in operation 305. The processor 240 of the electronic device 200 may permit the external electronic device 203 to access a communication network based on an input (e.g., selection of an object (e.g., an icon, an item, and the like) and the like) received through the UI.

Figure 4A:
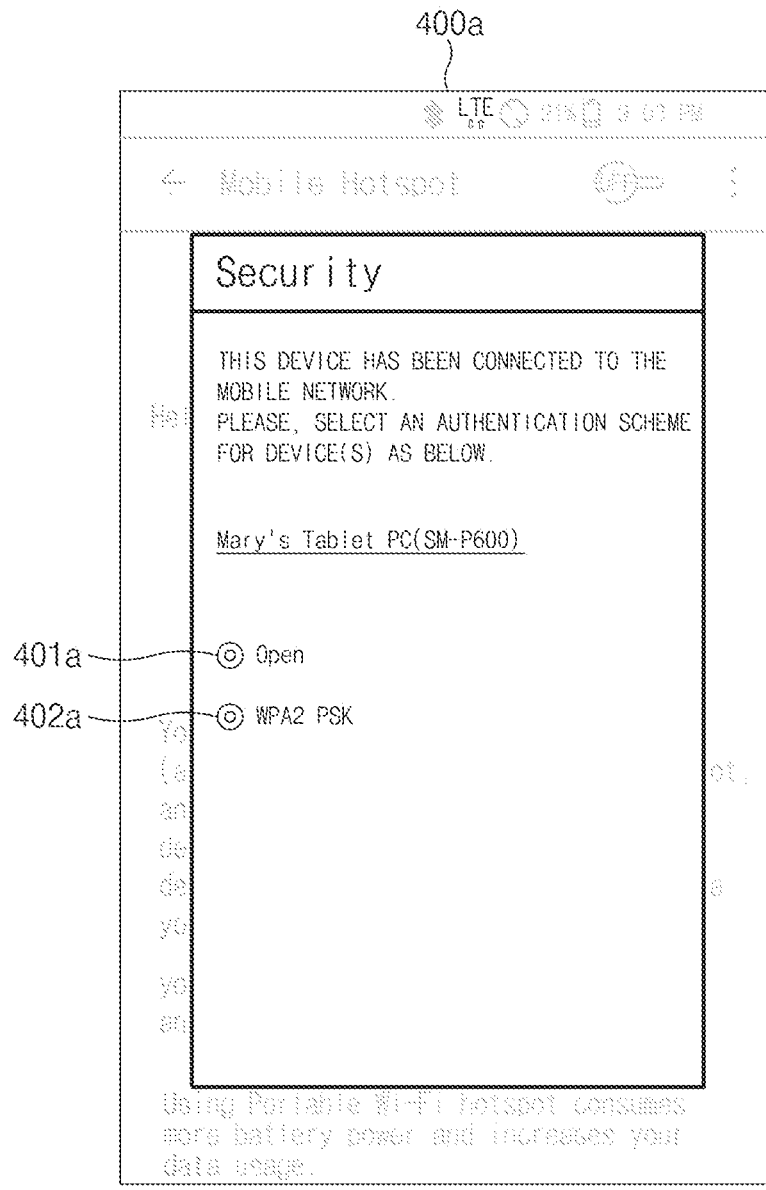
FIGS. 4A, 4B, and 4C are drawings illustrating a user interface (UI) screen according to various embodiments of the present disclosure.
Figure 4B:
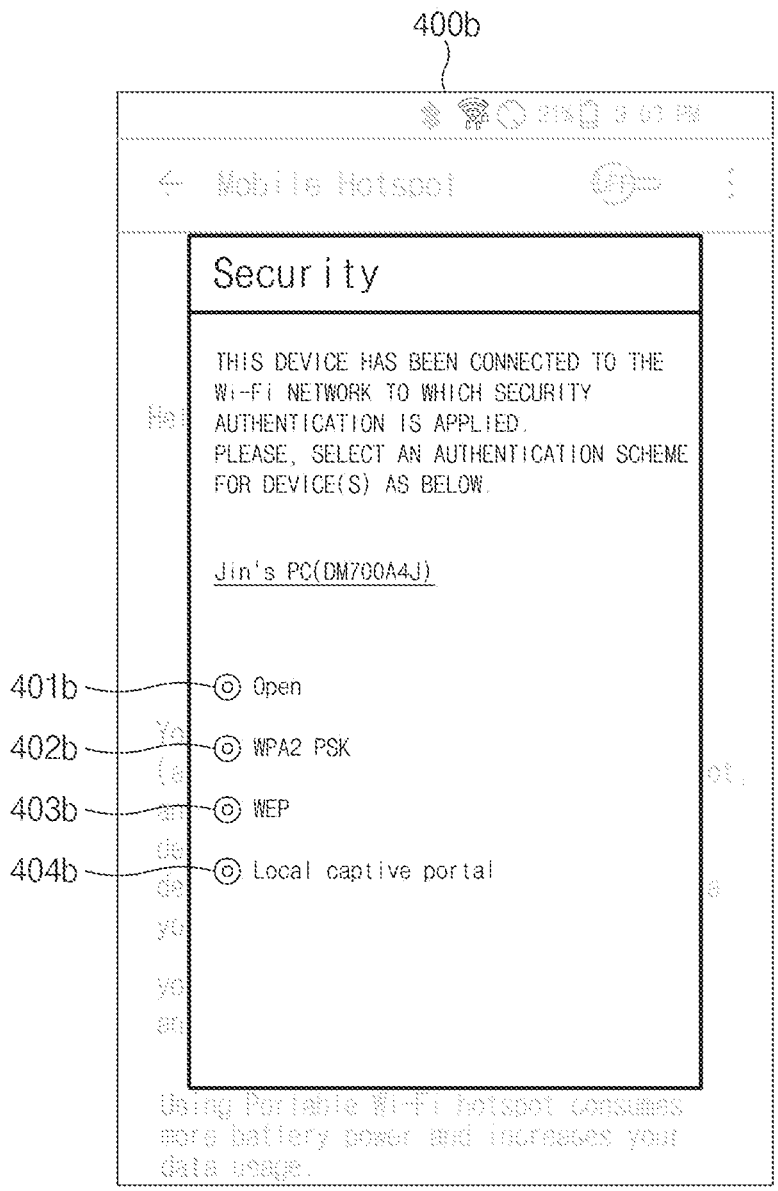
Figure 4C:
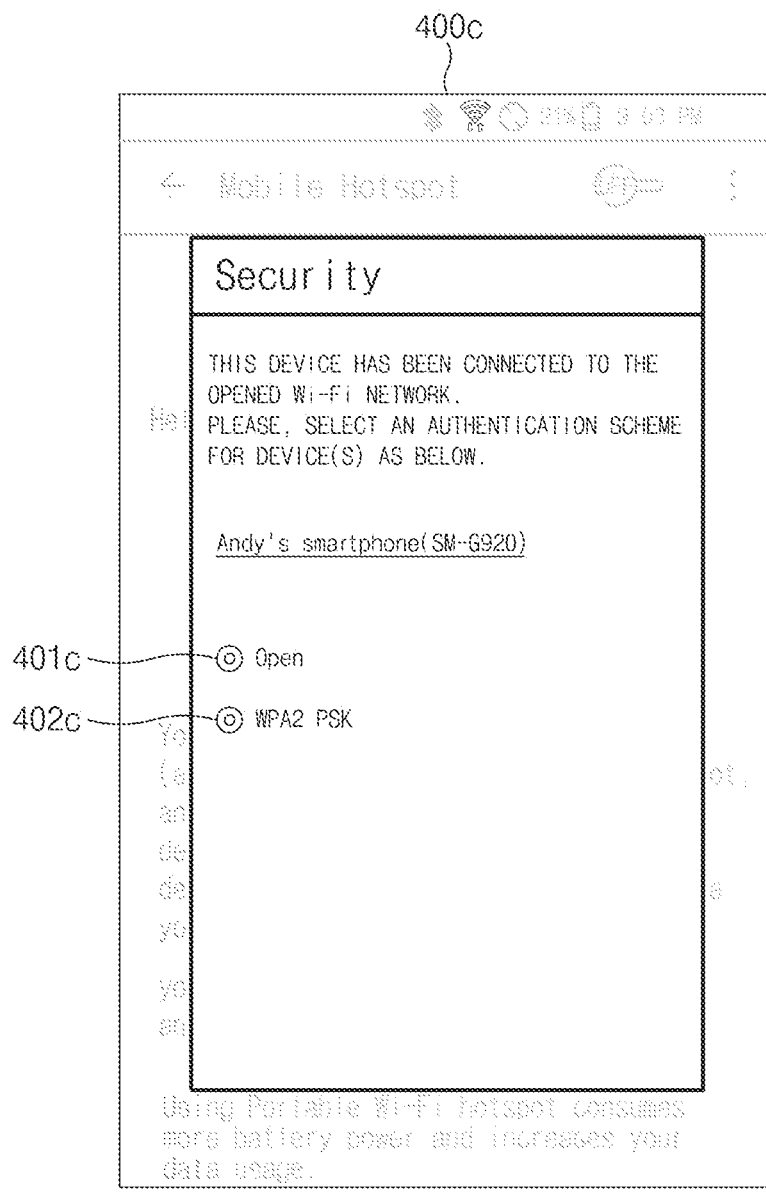

FIGS. 4A to 4C are drawings illustrating a UI screen according to various embodiments of the present disclosure.

Referring to FIG. 4A, for example, an electronic device 200 of FIG. 2 may access a cellular network (or a mobile network) 241 of FIG. 2 which uses LTE as a communication protocol. If a communication connection (e.g., a D2D connection 243 of FIG. 2) is established between the electronic device 200 and an external electronic device 203 of FIG. 2 (e.g., Mary's tablet PC (SM-P600)), a processor 240 of the electronic device 200 may provide a UI screen 400a to a user of the electronic device 200 through a display of the electronic device 200.

The user may select an object 401a or 402a displayed on the UI screen 400a. For example, if the object 401a is selected, the electronic device 200 may establish a public or open communication connection (e.g., the D2D connection 243) with the external electronic device 203 (e.g., the Mary's tablet PC (SM-P600)). Also, if the object 402a is selected, the electronic device 200 may establish a communication connection (e.g., the D2D connection 243), to which WPA2-PSK is applied, with the external electronic device 203 (e.g., the Mary's tablet PC (SM-P600)). According to an embodiment, only the object 402a may be activated and displayed to prevent an unauthenticated external electronic device from excessively using data. According to an embodiment, the electronic device 200 may select the object 402a irrespective of selection of the user.

Referring to FIG. 4B, for example, the electronic device 200 may access a Wi-Fi network 242 of FIG. 2 to which security authentication (or a specified authentication scheme) is applied. If the communication connection (e.g., the D2D connection 243) is established between the electronic device 200 and the external electronic device 203 (e.g., Jin's PC (DM700A4J)), the processor 240 of the electronic device 200 may provide a UI screen 400b to the user through the display.

The user may select one of objects 401b, 402b, 403b, and 404b displayed on the UI screen 400b. For example, the object 401b may be an object for setting an authentication scheme to "public or open". The object 402b may be an object for setting an authentication scheme to "WPA2-PSK". The object 403b may be an object for setting an authentication scheme to "WEP". The object 404b may be an object for setting an authentication scheme to "captive portal". The user may determine the authentication scheme of the communication connection (e.g., the D2D connection 243) between the electronic device 200 and the external electronic device 203 (e.g., the Jin's PC (DM700A4J)) by selecting one of the objects 401b, 402b, 403b, and 404b.

According to an embodiment, the processor 240 of the electronic device 200 may be configured to apply only an authentication scheme, corresponding to an authentication scheme of the accessed Wi-Fi network 242, to the communication connection (e.g., the D2D connection 243). For example, if the authentication scheme of the Wi-Fi network 242 corresponds to the WPA2-PSK, the processor 240 may activate only the object 402b to apply an authentication scheme (e.g., the WPA2-PSK and the like), corresponding to the authentication scheme of the Wi-Fi network 242, to the communication connection (e.g., the D2D connection 243). According to an embodiment, the processor 240 may select the object 402b irrespective of selection of the user.

Referring to FIG. 4C, for example, the electronic device 200 may access a public or open Wi-Fi network 242. If the communication connection (e.g., the D2D connection 243) is established between the electronic device 200 and the external electronic device 203 (e.g., Andy's smartphone (SM-G920)), the processor 240 of the electronic device 200 may provide a UI screen 400c to the user through the display.

The user may select an object 401c or 402c displayed on the UI screen 400c. For example, the object 401c may be an object for setting an authentication scheme to "public or open", and the object 402c may be an object for setting an authentication scheme to "WPA2-PSK". The user may determine an authentication scheme of the communication connection (e.g., the D2D connection 243) between the electronic device 200 and the external electronic device 203 (e.g., the Andy's smartphone (SM-G920)) by selecting the object 401c or 402c.

For example, if the object 401c is selected, the electronic device 200 may establish the public or open communication connection (e.g., the D2D connection 243) with the external electronic device 203 (e.g., the Andy's smartphone (SM-G920)). Also, if the object 402c is selected, the electronic device 200 may establish the communication connection (e.g., the D2D connection 243), to which the WPA2-PSK is applied, with the external electronic device 203 (e.g., the Andy's smartphone (SM-G920)). According to an embodiment, the processor 240 may select the object 401c or 402c without selection of the user.

The method for establishing the communication connection according to the above-mentioned various embodiments may be performed when an accessed communication network switches (e.g., where a handover is performed) based on physical location movement of the electronic device 200. For example, when the accessed communication network switches from a second communication network (e.g., the Wi-Fi network 242) to a first communication network (e.g., the cellular network 241) based on movement of the electronic device 200, the electronic device 200 may change an authentication scheme of the communication connection (e.g., the D2D connection 243) with the external electronic device 203. According to an embodiment, when the accessed communication network switches from the second communication network to the first communication network based on the movement of the electronic device 200, the electronic device 200 may provide the UI screen (e.g., FIGS. 4A to 4C) for changing an authentication scheme of the D2D connection 243 with the external electronic device 203.

Figure 5:
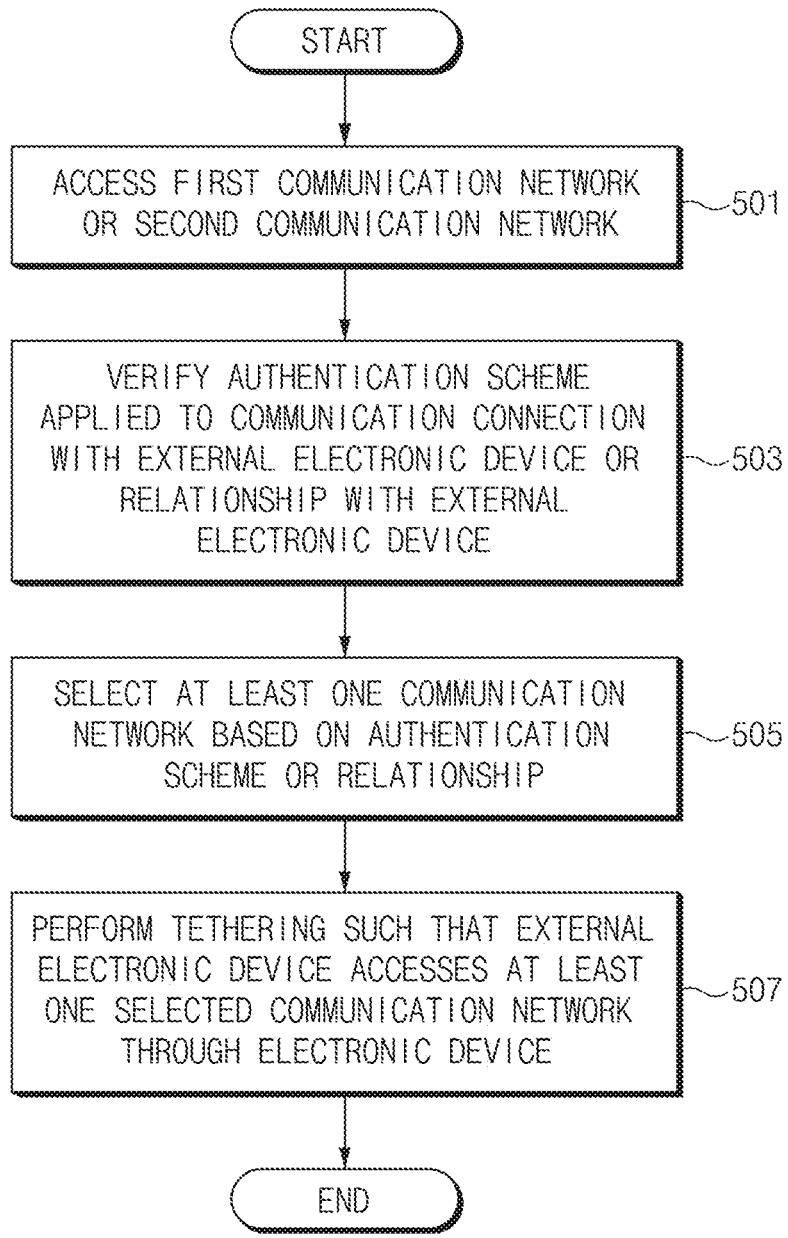
FIG. 5 is a flowchart illustrating a method for establishing a communication connection according to an embodiment of the present disclosure.

FIG. 5 is a flowchart illustrating a method for establishing a communication connection according to an embodiment of the present disclosure.

Referring to FIG. 5, the method for establishing the communication connection according to an embodiment may include operations 501 to 507. Operations 501 to 507 of the method for establishing the communication connection may be implemented with instructions executable by at least one processor (e.g., a processor 240 of FIG. 2). The implemented instructions may be stored in a computer-readable recording medium or a memory (e.g., a memory 220 of FIG. 2). Operations 501 to 507 of FIG. 5 are described using reference denotations of FIG. 2, and a repeated description will be omitted below.

In operation 501, for example, an electronic device 200 of FIG. 2 (e.g., the processor 240) may access a first communication network or a second communication network, independent of the first communication network, using at least one communication module 230 of FIG. 2. For example, the first communication network may correspond to a cellular network 241 of FIG. 2. Also, for example, the second communication network may correspond to at least one of a wired communication network or a local-area wireless communication network (e.g., a Wi-Fi network 242 of FIG. 2).

In operation 503, the electronic device 200 (e.g., the processor 240) may verify an authentication scheme, applied to a communication connection (e.g., a D2D connection 243 of FIG. 2) between the electronic device 200 and an external electronic device 203 of FIG. 2 or a relationship between the electronic device 200 and the external electronic device 203. According to an embodiment, the electronic device 200 (e.g., the processor 240) may verify the authentication scheme or the relationship in response to a connection request received from the external electronic device 203.

In operation 505, the electronic device 200 (e.g., the processor 240) may select, for example, at least one of the first communication network or the second communication network based on at least one of the authentication scheme or the relationship, verified in operation 503.

According to an embodiment, if an authentication scheme applied to the communication connection (e.g., the D2D connection 243) is "public or open", the electronic device 200 (e.g., the processor 240) may select the second communication network (e.g., the Wi-Fi network 242).

According to an embodiment, if a specified authentication scheme is applied to the communication connection (e.g., the D2D connection 243), the electronic device 200 (e.g., the processor 240) may select the first communication network (e.g., the cellular network 241) or the second communication network (e.g., the Wi-Fi network 242). For example, the specified authentication scheme may include a MAC authentication scheme, WEP, WPA, WPA2-PSK, EAP, captive portal, or their combinations.

According to an embodiment, if the external electronic device 203 has a specified relationship with the electronic device 200, the electronic device 200 (e.g., the processor 240) may select the first communication network (e.g., the cellular network 241) or the second communication network (e.g., the Wi-Fi network 242). The specified relationship (e.g., Table 1) may be stored in, for example, a memory 220 of FIG. 2.

According to an embodiment, if the external electronic device 203 does not have the specified relationship with the electronic device 200, the electronic device 200 (e.g., the processor 240) may select the second communication network (e.g., the Wi-Fi network 242).

In operation 507, the electronic device 200 (e.g., the processor 240) may perform, for example, tethering for the external electronic device 203 such that the external electronic device 203 may access the at least one communication network, selected in operation 505 through the electronic device 200. In other words, the external electronic device 203 may access the at least one communication network, selected in operation 505, through the communication connection (e.g., the D2D connection 243) with the electronic device 200.

According to various embodiments, the processor 240 may provide a UI, for notifying a user of the electronic device 200 of at least one selectable communication network, to him or her. The processor 240 of the electronic device 200 may permit the external electronic device 203 to access the communication network based on an input (e.g., object selection and the like) received through the UI.

Figure 6A:
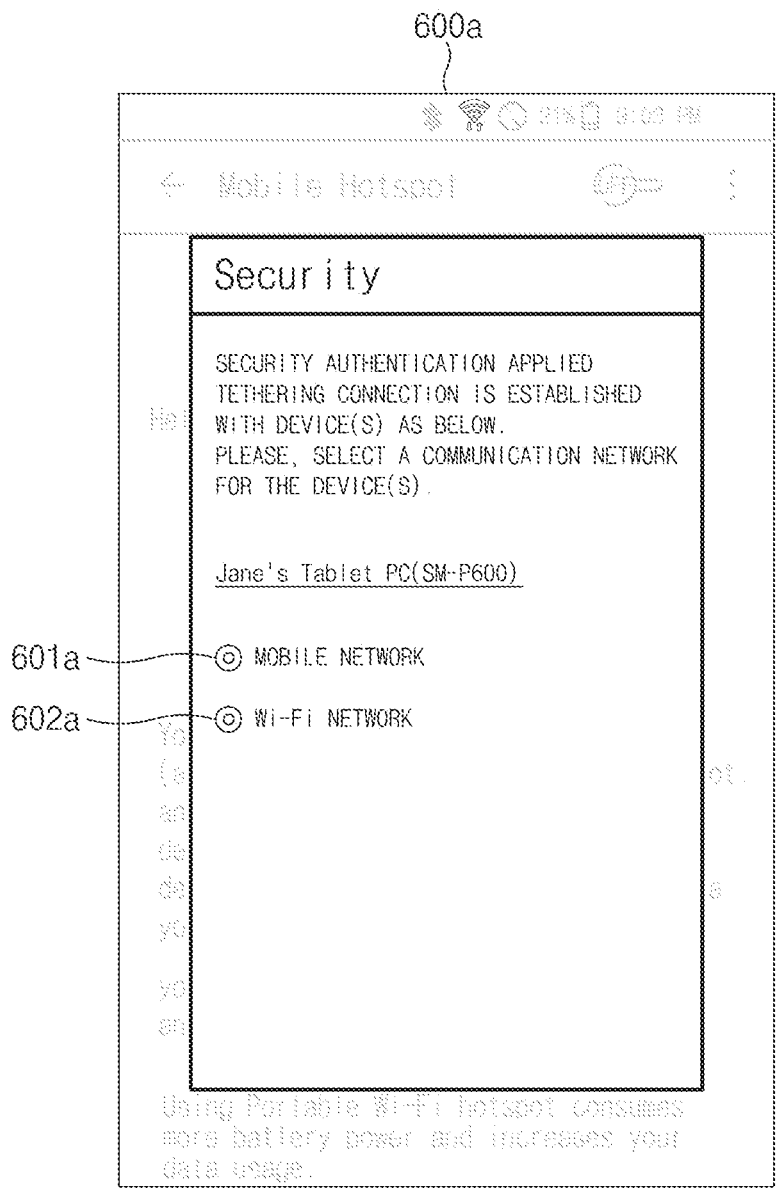
FIGS. 6A and 6B are drawings illustrating a UI screen according to various embodiments of the present disclosure.
Figure 6B:
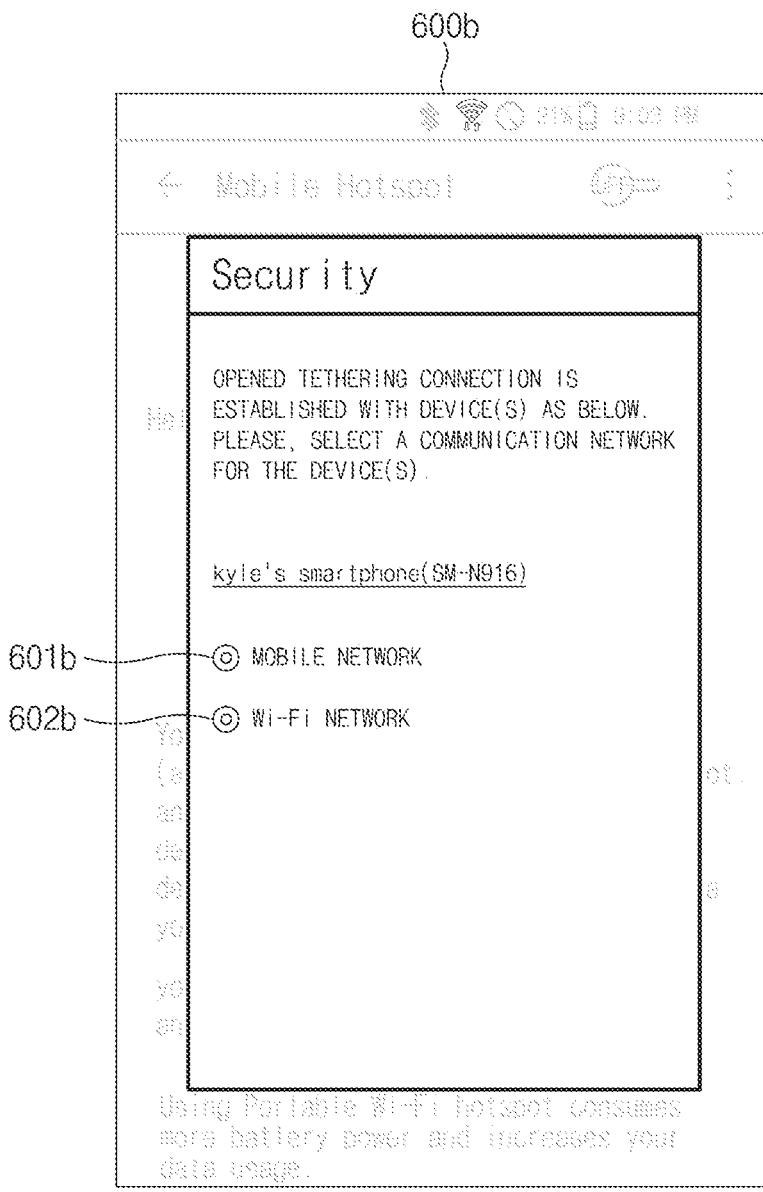

FIGS. 6A and 6B are drawings illustrating a UI screen according to various embodiments of the present disclosure.

Referring to FIG. 6A, for example, an electronic device 200 of FIG. 2 may establish a communication connection (e.g., a D2D connection 243 of FIG. 2) (or a tethering connection), to which security authentication (or a specified authentication scheme) is applied, with an external electronic device 203 of FIG. 2 (e.g., Jane's tablet (SM-P600)). If the communication connection (e.g., the D2D connection 243) is established between the electronic device 200 and the external electronic device 203 (e.g., the Jane's tablet (SM-P600)), a processor 240 of the electronic device 200 may provide a UI screen 600*a* to the user through a display of the electronic device 200.

The user may select at least one of an object 601*a* or 602*a* displayed on the UI screen 600*a*. For example, if the object 601*a* is selected, the electronic device 200 may provide access to a mobile network through the communication connection (e.g., the D2D connection 243) to the external electronic device 203 (e.g., the Jane's tablet (SM-P600)). Meanwhile, if the object 602*a* is selected, the electronic device 200 may provide access to a Wi-Fi network 242 through the D2D connection 243 to the external electronic device 203 (e.g., the Jane's tablet (SM-P600)). In other words, since the external electronic device 203 (e.g., the Jane's tablet (SM-P600)) establishes a communication connection, to which security authentication is applied, with the electronic device 200, it may indirectly access the mobile network and/or the Wi-Fi network according to selection of the user. According to an embodiment, the electronic device 200 may select the object 601*a* or 602*a* irrespective of selection of the user.

Referring to FIG. 6B, for example, the electronic device 200 may establish a public or open communication connection (e.g., the D2D connection 243) (or a tethering connection) with the external electronic device 203 (e.g., Kyle's smartphone (SM-N916)). If the communication connection is established between the electronic device 200 and the external electronic device 203 (e.g., the Kyle's smartphone (SM-N916)), the processor 240 of the electronic device 200 may provide a UI screen 600*b* to the user through the display.

The user may select an object 601*b* or 602*b* displayed on the UI screen 600*b*. For example, if the object 601*b* is selected, the electronic device 200 may provide access to the mobile network through the communication connection (e.g., the D2D connection 243) to the external electronic device 203 (e.g., the Kyle's smartphone (SM-N916)). Meanwhile, if the object 602b is selected, the electronic device 200 may provide access to the Wi-Fi network through the communication connection (e.g., the D2D connection 243) to the external electronic device 203 (e.g., the Kyle's smartphone (SM-N916)). According to an embodiment, the electronic device 200 may select the object 602b irrespective of selection of the user.

According to an embodiment, to prevent the unauthenticated external electronic device 203 from excessively using data, only the object 602b may be activated and displayed on the UI screen 600b. In other words, the processor 240 of the electronic device 200 may not permit the external electronic device 203, accessed through a public or open communication connection (or a tethering connection), to access a mobile network (e.g., the cellular network 241).

Figure 7A:
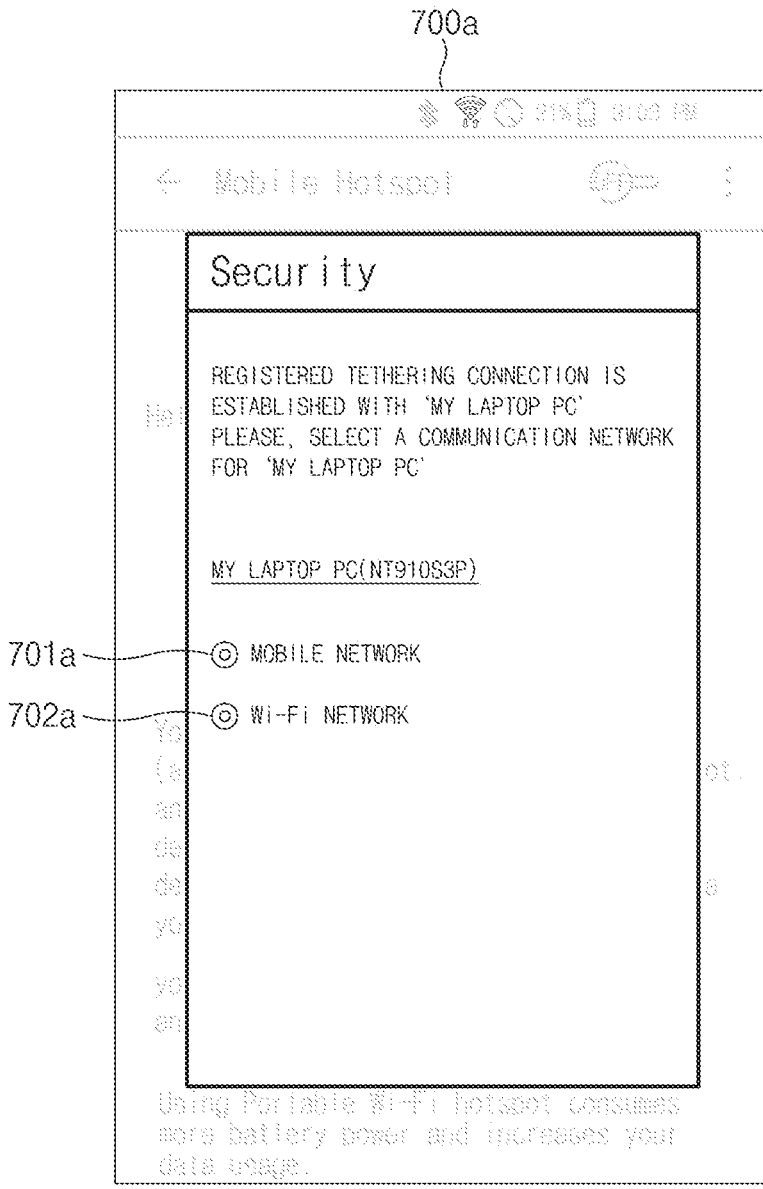
FIGS. 7A and 7B are drawings illustrating a UI screen according to various embodiments of the present disclosure.
Figure 7B:
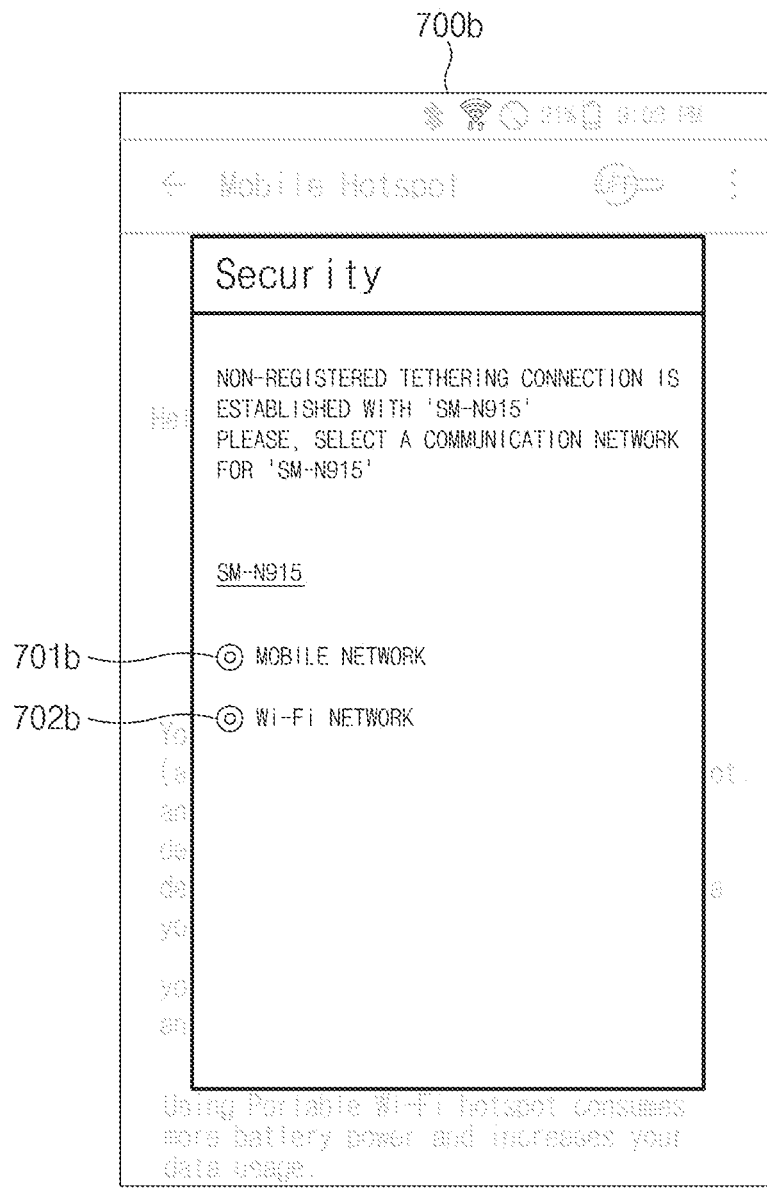

FIGS. 7A and 7B are drawings illustrating a UI screen according to various embodiments of the present disclosure.

Referring to FIG. 7A, for example, an electronic device 200 of FIG. 2 may establish a D2D connection (or a tethering connection) with a previously registered external electronic device 203 (e.g., my laptop PC (NT910S3P)). A relationship between the electronic device 200 and the external electronic device 203 may be stored in, for example, a memory 220 of FIG. 2 (refer to Table 1). If a communication connection is established between the electronic device 200 and the external electronic device 203 (e.g., my laptop PC (NT910S3P)), a processor 240 of the electronic device 200 may provide a UI screen 700a to a user of the electronic device 200 through a display of the electronic device 200.

The user may select at least one of an object 701a or 702a display on the UI screen 700a. For example, if the object 701a is selected, the electronic device 200 may provide access to a mobile network through the communication connection (e.g., the D2D connection 243) to the external electronic device 203 (e.g., my laptop PC (NT910S3P)). Meanwhile, if the object 702a is selected, the electronic device 200 may provide access to a Wi-Fi network through the communication connection (e.g., the D2D connection 243) to the external electronic device 203 (e.g., my laptop PC (NT910S3P)). In other words, since the external electronic device 203 (e.g., my laptop PC (NT910S3P)) is an electronic device previously registered in the electronic device 200, it may indirectly access the mobile network and/or the Wi-Fi network based on selection of the user. According to an embodiment, the electronic device 200 may select the object 701a or 702a irrespective of selection of the user.

Referring to FIG. 7B, for example, the electronic device 200 may establish the communication connection (e.g., the D2D connection 243) (or the tethering connection) with the nonregistered external electronic device 203 (e.g., SM-N915). A relationship between the electronic device 200 and the external electronic device 203 (e.g., SM-N915) may not be defined in, for example, the memory 220. If the communication connection (e.g., the D2D connection 243) is established between the electronic device 200 and the external electronic device 203 (e.g., SM-N915), the processor 240 of the electronic device 200 may provide a UI screen 700b to the user through the display.

The user may select an object 701b or 702b displayed on the UI screen 700b. For example, if the object 701b is selected, the electronic device 200 may provide access to the mobile network through the communication connection (e.g., the D2D connection 243) to the external electronic device 203 (e.g., SM-N915). Meanwhile, if the object 702b is selected, the electronic device 200 may provide access to the Wi-Fi network through the communication connection (e.g., the D2D connection 243) to the external electronic device 203 (e.g., SM-N915).

According to an embodiment, to prevent the nonregistered external electronic device 203 from excessively using data, only the object 702b may be activated and displayed on the UI screen 700b. According to an embodiment, the electronic device 200 may select the object 702b irrespective of selection of the user. In other words, the processor 240 of the electronic device 200 may not permit the external electronic device 203 (e.g., SM-N915) which is not previously registered in the memory 220 to access the mobile network (e.g., the cellular network 241).

According to an embodiment of the present disclosure, an electronic device may determine an authentication scheme of a communication connection (e.g., a D2D connection) based on properties of a communication network. Also, according to an embodiment of the present disclosure, the electronic device may determine a communication network to be granted access to an external electronic device, based on at least one of the authentication scheme of the communication connection (e.g., the D2D connection) or a relationship with the external electronic device. Therefore, the electronic device which provides a tethering connection to the external electronic device may prevent an unauthenticated or nonregistered device from using the tethering connection without permission.

Figure 8:
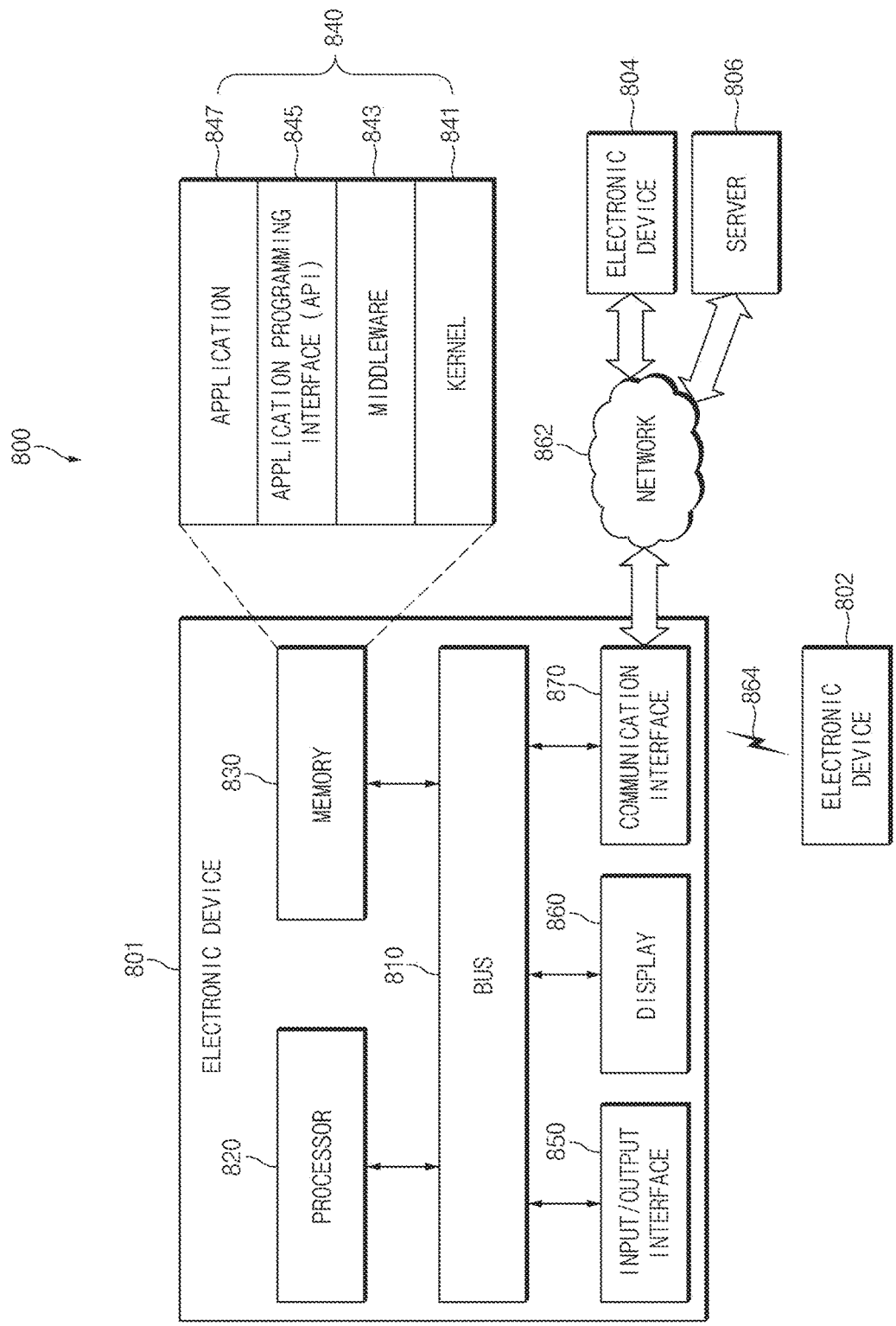
FIG. 8 is a block diagram illustrating a configuration of an electronic device according to an embodiment of the present disclosure.

FIG. 8 is a block diagram illustrating a configuration of an electronic device according to an embodiment of the present disclosure.

Referring to FIG. 8, in an embodiment, an electronic device 801 and an external electronic device 802, an external electronic device 804, or a server 806 may connect with each other over a network 862 or local-area communication 864 of the configuration 800. The electronic device 801 may include a bus 810, a processor 820, a memory 830, an input and output interface 850, a display 860, and a communication interface 870. In various embodiments, at least one of the components may be omitted from the electronic device 801, or other components may be additionally included in the electronic device 801.

The bus 810 may be, for example, a circuit which connects the components 820 to 870 with each other and transmits a communication message (e.g., a control message and/or data) between the components 820 to 870.

The processor 820 may include one or more of a CPU, an AP, or a CP. For example, the processor 820 may perform calculation or data processing about control and/or communication of at least another of the components of the electronic device 701.

The memory 830 may include a volatile and/or nonvolatile memory. The memory 830 may store, for example, a command or data associated with at least another of the components of the electronic device 801. According to an embodiment, the memory 830 may software and/or a program 840. The program 840 may include, for example, a kernel 841, a middleware 843, an application programming interface (API) 845, and/or at least one application program 847 (or "at least one application"), and the like. At least part of the kernel 841, the middleware 843, or the API 845 may be referred to as an operating system (OS).

The kernel 841 may control or manage, for example, system resources (e.g., the bus 810, the processor 820, or the memory 830, and the like) used to execute an operation or function implemented in the other programs (e.g., the middleware 843, the API 845, or the application program 847). Also, as the middleware 843, the API 845, or the application program 847 accesses a separate component of the electronic device 801, the kernel 841 may provide an interface which may control or manage system resources.

The middleware 843 may play a role as, for example, a go-between such that the API 845 or the application program 847 communicates with the kernel 841 to communicate data.

Also, the middleware 843 may process one or more work requests, received from the at least one application program 847, in order of priority. For example, the middleware 843 may assign priority which may use system resources (the bus 810, the processor 820, or the memory 830, and the like) of the electronic device 801 to at least one of the at least one application program 847. For example, the middleware 843 may perform scheduling or load balancing for the one or more work requests by processing the one or more work requests in order of the priority assigned to the at least one of the at least one application program 847.

The API 845 may be, for example, an interface in which the application program 847 controls a function provided from the kernel 841 or the middleware 843. For example, the API 845 may include at least one interface or function (e.g., a command) for file control, window control, image processing, or text control, and the like.

The input and output interface 850 may play a role as, for example, an interface which may transmit a command or data input from a user or another external device to another component (or other components) of the electronic device 801. Also, input and output interface 850 may output a command or data received from another component (or other components) of the electronic device 801 to the user or the other external device.

The display 860 may include, for example, a liquid crystal display (LCD), a light emitting diode (LED) display, an organic LED (OLED) display, a microelectromechanical systems (MEMS) display, or an electronic paper display. The display 860 may display, for example, a variety of content (e.g., text, images, videos, icons, or symbols, and the like) to the user. The display 860 may include a touch screen, and may receive, for example, touch, gesture, proximity, or a hovering input using an electronic pen or part of a body of the user.

The communication interface 870 may establish communication between, for example, the electronic device 801 and an external device (e.g., a first external electronic device 802, a second external electronic device 804, or a server 806). For example, the communication interface 870 may connect to a network 862 through wireless communication or wired communication and may communicate with the external device (e.g., the second external electronic device 804 or the server 806).

The wireless communication may use, for example, at least one of LTE, LTE-A, CDMA, WCDMA, UMTS, WiBro, or GSM, and the like as a cellular communication protocol. Also, the wireless communication may include, for example, the local-area communication 864. The local-area communication 864 may include, for example, at least one of Wi-Fi communication, BT communication, near field communication (NFC) communication, magnetic stripe transmission (MST) communication, or GNSS communication, and the like.

An MST module may generate a pulse based on transmission data using an electromagnetic signal and may generate a magnetic field signal based on the pulse. The electronic device 801 may send the magnetic field signal to a POS system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" may be used interchangeably with the "GNSS". The wired communication may include at least one of, for example, USB communication, high definition multimedia interface (HDMI) communication, RS-232 communication, or plain old telephone service (POTS) communication, and the like. The network 862 may include a telecommunications network, for example, at least one of a computer network (e.g., a local area network (LAN) or a wide area network (WAN)), the Internet, or a telephone network.

Each of the first and second external electronic devices 802 and 804 may be the same as or different device from the electronic device 801. According to an embodiment, the server 806 may include a group of one or more servers. According to various embodiments, all or some of operations executed in the electronic device 801 may be executed in another electronic device or a plurality of electronic devices (e.g., the external electronic device 802, the external electronic device 804, or the server 806). According to an embodiment, if the electronic device 801 should perform any function or service automatically or according to a request, it may request another device (e.g., the external electronic device 802, the external electronic device 804, or the server 806) to perform at least part of the function or service, rather than executing the function or service for itself or in addition to the function or service. The other electronic device (e.g., the external electronic device 802, the external electronic device 804, or the server 806) may execute the requested function or the added function and may transmit the executed result to the electronic device 801. The electronic device 801 may process the received result without change or additionally and may provide the requested function or service. For this purpose, for example, cloud computing technologies, distributed computing technologies, or client-server computing technologies may be used.

Figure 9:
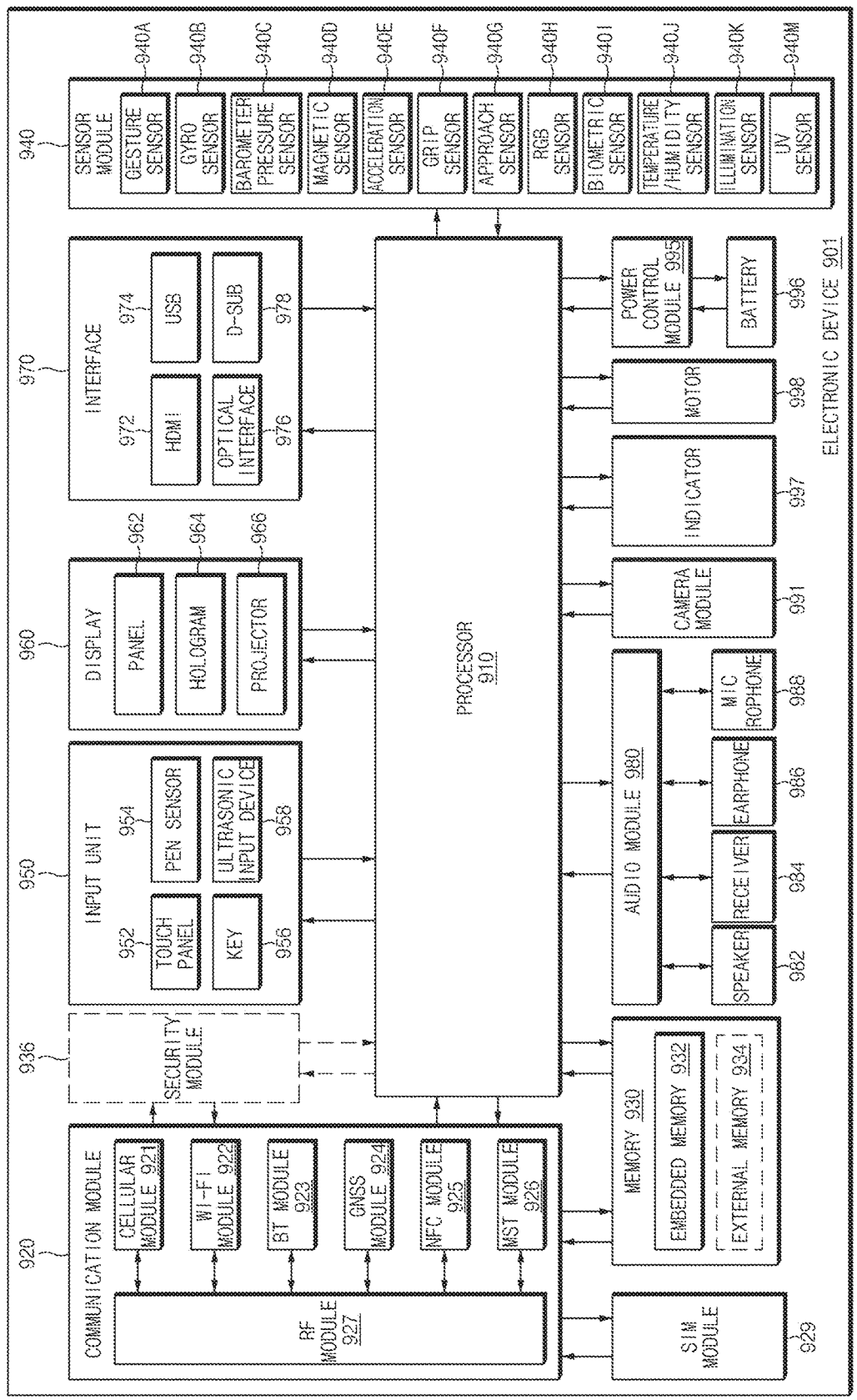
FIG. 9 is a block diagram illustrating a configuration of an electronic device according to an embodiment of the present disclosure.

FIG. 9 is a block diagram illustrating a configuration of an electronic device according to an embodiment of the present disclosure.

Referring to FIG. 9, an electronic device 901 may include, for example, all or part of an electronic device 801 shown in FIG. 8. The electronic device 901 may include one or more processors 910 (e.g., APs), a communication module 920, a SIM 929, a memory 930, a security module 936, a sensor module 940, an input device 950, a display 960, an interface 970, an audio module 980, a camera module 991, a power management module 995, a battery 996, an indicator 997, and a motor 998.

The processor 910 may drive, for example, an OS or an application program to control a plurality of hardware or software components connected thereto and may process and compute a variety of data. The processor 910 may be implemented with, for example, a system on chip (SoC). According to an embodiment, the processor 910 may include a graphics processing unit (GPU) (not shown) and/or an image signal processor (ISP) (not shown). The processor 910 may include at least some (e.g., a cellular module 921) of the components shown in FIG. 9. The processor 910 may load a command or data received from at least one of other components (e.g., a non-volatile memory) into a volatile memory to process the data and may store various data in a non-volatile memory.

The communication module 920 may have the same or similar configuration to a communication interface 870 of FIG. 8. The communication module 920 may include, for example, the cellular module 921, a Wi-Fi module 922, a BT module 923, a GNSS module 924 (e.g., a GPS module, a Glonass module, a Beidou module, or a Galileo module), a NFC module 925, an MST module 926, and a RF module 927.

The cellular module 921 may provide, for example, a voice call service, a video call service, a text message service, or an Internet service, and the like through a communication network. According to an embodiment, the cellular module 921 may identify and authenticate the electronic device 901 in a communication network using the SIM 929 (e.g., a SIM card). According to an embodiment, the cellular module 921 may perform at least part of functions which may be provided by the processor 910. According to an embodiment, the cellular module 921 may include a CP.

The Wi-Fi module 922, the BT module 923, the GNSS module 924, the NFC module 925, or the MST module 926 may include, for example, a processor for processing data transmitted and received through the corresponding module. According to various embodiments, at least some (e.g., two or more) of the cellular module 921, the Wi-Fi module 922, the BT module 923, the GNSS module 924, the NFC module 925, or the MST module 926 may be included in one integrated chip (IC) or one IC package.

The RF module 927 may transmit and receive, for example, a communication signal (e.g., an RF signal). Though not shown, the RF module 927 may include, for example, a transceiver, a power amplifier module (PAM), a frequency filter, or a low noise amplifier (LNA), or an antenna, and the like. According to an embodiment, at least one of the cellular module 921, the Wi-Fi module 922, the BT module 923, the GNSS module 924, the NFC module 925, or the MST module 926 may transmit and receive an RF signal through a separate RF module.

The SIM 929 may include, for example, a card which includes a SIM and/or an embedded SIM. The SIM 929 may include unique identification information (e.g., an integrated circuit card identifier (ICCID)) or subscriber information (e.g., an IMSI).

The memory 930 (e.g., a memory 830 of FIG. 8) may include, for example, an embedded memory 932 or an external memory 934. The embedded memory 932 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 934 may include a flash drive, for example, a compact flash (CF), a secure digital (SD), a micro-SD, a mini-SD, an extreme digital (xD), a multimedia card (MMC), or a memory stick, and the like. The external memory 934 may operatively and/or physically connect with the electronic device 801 through various interfaces.

The security module 936 may be a module which has a relatively higher secure level than the memory 930 and may be a circuit which stores secure data and guarantees a protected execution environment. The security module 936 may be implemented with a separate circuit and may include a separate processor. The security module 936 may include, for example, an embedded secure element (eSE) which is present in a removable smart chip or a removable SD card or is embedded in a fixed chip of the electronic device 901. Also, the security module 936 may be driven by an OS different from the OS of the electronic device 901. For example, the security module 936 may operate based on a java card open platform (JCOP) OS.

The sensor module 940 may measure, for example, a physical quantity or may detect an operation state of the electronic device 901, and may convert the measured or detected information to an electric signal. The sensor module 940 may include at least one of, for example, a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 940 may further include a control circuit for controlling at least one or more sensors included therein. According to various embodiments, the electronic device 901 may further include a processor configured to control the sensor module 940, as part of the processor 910 or to be independent of the processor 910. While the processor 910 is in a sleep state, the electronic device 901 may control the sensor module 940.

The input device 950 may include, for example, a touch panel 952, a (digital) pen sensor 954, a key 956, or an ultrasonic input unit 958. The touch panel 952 may use at least one of, for example, a capacitive type, a resistive type, an IR type, or an ultrasonic type. Also, the touch panel 952 may include a control circuit. The touch panel 952 may further include a tactile layer and may provide a tactile reaction to a user.

The (digital) pen sensor 954 may be, for example, part of the touch panel 952 or may include a separate sheet for recognition. The key 956 may include, for example, a physical button, an optical key, or a keypad. The ultrasonic input unit 958 may allow the electronic device 901 to detect a sound wave using a microphone (e.g., a microphone 988) and to verify data through an input tool generating an ultrasonic signal.

The display 960 (e.g., a display 860 of FIG. 8) may include a panel 962, a hologram device 964, or a projector 966. The panel 962 may include the same or similar configuration to the display 860. The panel 962 may be implemented to be, for example, flexible, transparent, or wearable. The panel 962 and the touch panel 952 may be integrated into one module. The hologram device 964 may show a stereoscopic image in a space using interference of light. The projector 966 may project light onto a screen to display an image. The screen may be positioned, for example, inside or outside the electronic device 901. According to an embodiment, the display 960 may further include a control circuit for controlling the panel 962, the hologram device 964, or the projector 966.

The interface 970 may include, for example, a HDMI 972, a USB 974, an optical interface 976, or a D-subminiature 978. The interface 970 may be included in, for example, a communication interface 870 shown in FIG. 8. Additionally or alternatively, the interface 970 may include, for example, a mobile high definition link (MHL) interface, an SD card/MMC interface, or an infrared data association (IrDA) standard interface.

The audio module 980 may interchangeably convert a sound into an electric signal. At least part of components of the audio module 980 may be included in, for example, an input and output interface 850 shown in FIG. 8. The audio module 980 may process sound information input or output through, for example, a speaker 982, a receiver 984, an earphone 986, or the microphone 988, and the like.

The camera module 991 may be a device which captures a still image and a moving image. According to an embodiment, the camera module 991 may include one or more image sensors (not shown) (e.g., a front sensor or a rear sensor), a lens (not shown), an ISP (not shown), or a flash (not shown) (e.g., an LED or a xenon lamp).

The power management module 995 may manage, for example, power of the electronic device 901. According to an embodiment, though not shown, the power management module 995 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 901 or part (e.g., the processor 910) thereof, for example, a booting state, a message state, or a charging state, and the like. The motor 998 may convert an electric signal into mechanical vibration and may generate vibration or a haptic effect, and the like. Though not shown, the electronic device 901 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 10:
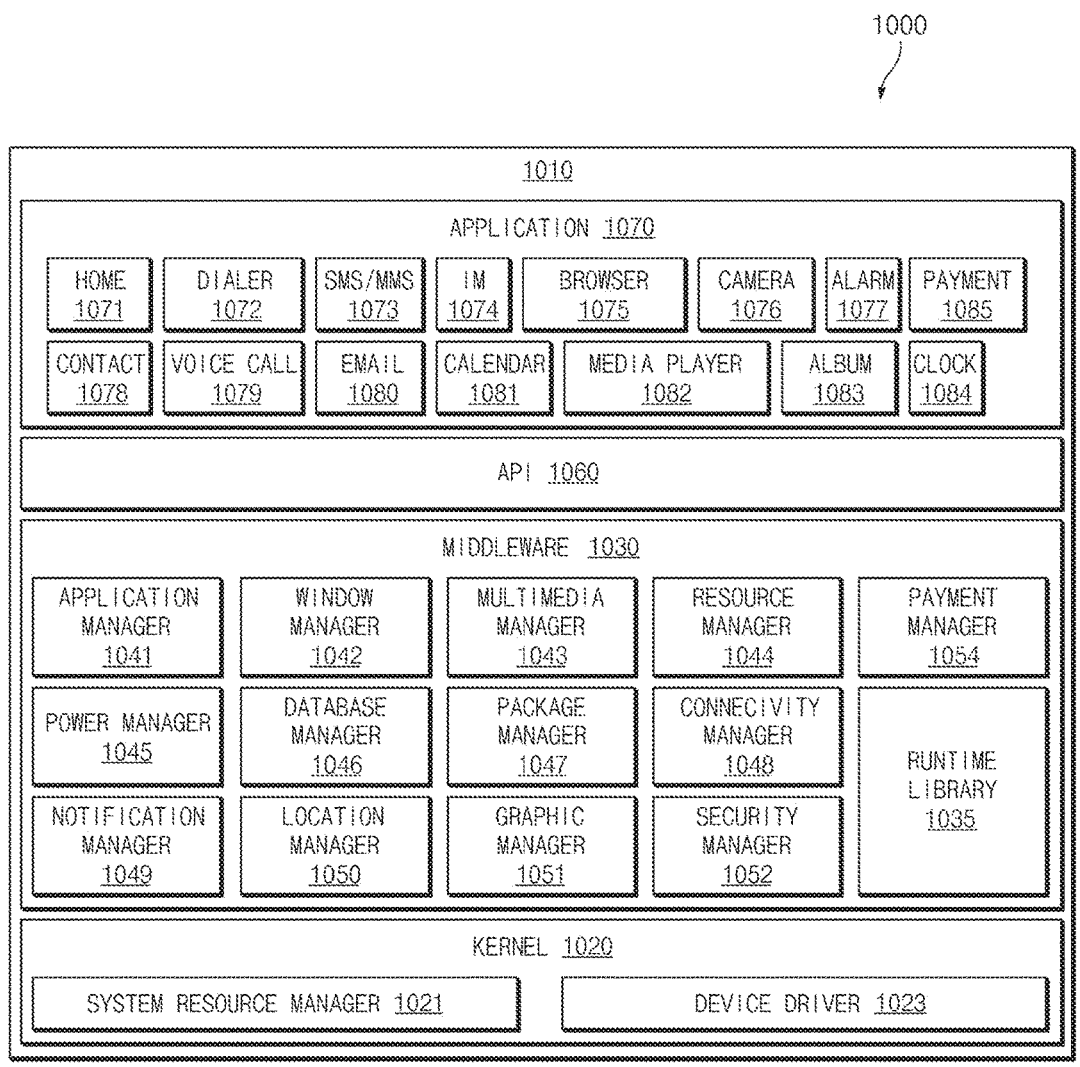
FIG. 10 is a block diagram illustrating a configuration of a program module according to an embodiment of the present disclosure.

FIG. 10 is a block diagram illustrating a configuration of a program module according to an embodiment of the present disclosure.

Referring to FIG. 10, according to an embodiment, the configuration 1000 of the program module 1010 (e.g., a program 840 of FIG. 8) may include an OS for controlling resources associated with an electronic device (e.g., an electronic device 801 of FIG. 8) and/or various applications (e.g., at least one application program 847 of FIG. 8) which are executed on the OS. The OS may be, for example, Android, iOS, Windows, Symbian, Tizen, or Bada, and the like.

The program module 1010 may include a kernel 1020, a middleware 1030, an API 1060, and/or at least one application 1070. At least part of the program module 1010 may be preloaded on the electronic device, or may be downloaded from an external electronic device (e.g., an external electronic device 802, an external electronic device 804, or a server 806, and the like of FIG. 8).

The kernel 1020 (e.g., a kernel 841 of FIG. 8) may include, for example, a system resource manager 1021 and/or a device driver 1023. The system resource manager 1021 may control, assign, or collect, and the like system resources. According to an embodiment, the system resource manager 1021 may include a process management unit, a memory management unit, or a file system management unit, and the like. The device driver 1023 may include, for example, a display driver, a camera driver, a BT driver, a shared memory driver, a USB driver, a keypad driver, a Wi-Fi driver, an audio driver, or an inter-process communication (IPC) driver.

The middleware 1030 (e.g., a middleware 843 of FIG. 8) may provide, for example, functions the application 1070 needs in common, and may provide various functions to the application 1070 through the API 1060 such that the application 1070 efficiently uses limited system resources in the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module used by a compiler to add a new function through a programming language while the application 1070 is executed. The runtime library 1035 may perform a function about input and output management, memory management, or an arithmetic function.

The application manager 1041 may manage, for example, a life cycle of at least one of the at least one application 1070. The window manager 1042 may manage graphical user interface (GUI) resources used on a screen of the electronic device. The multimedia manager 1043 may determine a format necessary for reproducing various media files and may encode or decode a media file using a codec corresponding to the corresponding format. The resource manager 1044 may manage source codes of at least one of the at least one application 1070, and may manage resources of a memory or a storage space, and the like.

The power manager 1045 may act together with, for example, a basic input/output system (BIOS) and the like, may manage a battery or a power source, and may provide power information necessary for an operation of the electronic device. The database manager 1046 may generate, search, or change a database to be used in at least one of the at least one application 1070. The package manager 1047 may manage installation or update of an application distributed by a type of a package file.

The connectivity manager 1048 may manage, for example, wireless connection such as Wi-Fi connection or BT connection, and the like. The notification manager 1049 may display or notify events, such as an arrival message, an appointment, and proximity notification, by a method which is not disturbed to the user. The location manager 1050 may manage location information of the electronic device. The graphic manager 1051 may manage a graphic effect to be provided to the user or a UI related to the graphic effect. The security manager 1052 may provide all security functions necessary for system security or user authentication, and the like. According to an embodiment, when the electronic device (e.g., the electronic device 801) has a phone function, the middleware 1030 may further include a telephony manager (not shown) for managing a voice or video communication function of the electronic device.

The middleware 1030 may include a middleware module which configures combinations of various functions of the above-described components. The middleware 1030 may provide a module which specializes according to kinds of OSs to provide a differentiated function. Also, the middleware 1030 may dynamically delete some of old components or may add new components.

The API 1060 (e.g., an API 845 of FIG. 8) may be, for example, a set of API programming functions, and may be provided with different components according to OSs. For example, in case of Android or iOS, one API set may be provided according to platforms. In case of Tizen, two or more API sets may be provided according to platforms.

The application 1070 (e.g., the application program 847) may include one or more of, for example, a home application 1071, a dialer application 1072, a short message service (SMS)/multimedia message service (MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, a payment application 1085, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1070 may include an application (hereinafter, for better understanding and ease of description, referred to as "information exchange application") for exchanging information between the electronic device (e.g., the electronic device 801) and an external electronic device (e.g., the external electronic device 802 or the external electronic device 804). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the external electronic device 802 or the external electronic device 804). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the external electronic device 802 or the external electronic device 804) which communicates with the electronic device, an application which operates in the external electronic device, or a service (e.g., a call service or a message service) provided from the external electronic device.

According to an embodiment, the application 1070 may include an application (e.g., the health card application of a mobile medical device) which is preset according to attributes of the external electronic device (e.g., the external electronic device 802 or the external electronic device 804). According to an embodiment, the application 1070 may include an application received from the external electronic device (e.g., the server 806, the external electronic device 802, or the external electronic device 804). According to an embodiment, the application 1070 may include a preloaded application or a third party application which may be downloaded from a server. Names of the components of the program module 1010 according to various embodiments of the present disclosure may differ according to kinds of OSs.

According to various embodiments, at least part of the program module 1010 may be implemented with software, firmware, hardware, or at least two or more combinations thereof. At least part of the program module 1010 may be implemented (e.g., executed) by, for example, a processor (e.g., a processor 910 of FIG. 9). At least part of the program module 1010 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

An electronic device according to an embodiment of the present disclosure may include at least one communication module and a processor configured to control the at least one communication module. The processor may be configured to verify properties of at least one communication network accessed by the electronic device through the at least one communication module, to determine an authentication scheme to be applied to a communication connection between the electronic device and an external electronic device, based on the properties, and to establish the communication connection such that the external electronic device accesses the at least one communication network through the electronic device based on the authentication scheme.

In the electronic device according to an embodiment, the properties may include an authentication scheme, a type, a charging policy, a data rate, or a network operator of the at least one communication network, or their combinations.

In the electronic device according to an embodiment, the at least one communication module may include a first communication module configured to access the at least one communication network and a second communication module configured to establish the communication connection between the external electronic device and the electronic device.

In the electronic device according to an embodiment, the first communication module may include a first Wi-Fi module. The second communication module may include a second Wi-Fi module.

In the electronic device according to an embodiment, the processor may be configured to apply a specified authentication scheme to the communication connection if the at least one communication network corresponds to a cellular network.

In the electronic device according to an embodiment, the processor may be configured to apply a second specified authentication scheme, corresponding to a first specified authentication scheme, to the communication connection if the first specified authentication scheme is applied to the at least one communication network.

In the electronic device according to an embodiment, the specified authentication scheme, the first specified authentication scheme, or the second specified authentication scheme may include a MAC authentication scheme, WEP, WPA, WPA2-PSK, EAP, captive portal, or their combinations.

In the electronic device according to an embodiment, the processor may be configured to determine the authentication scheme of the communication connection as "public or open" if an authentication scheme of the at least one communication network is "public or open".

An electronic device according to an embodiment of the present disclosure may include at least one communication module configured to access a first communication network or a second communication network and a processor configured to control the at least one communication module. The processor may be configured to verify an authentication scheme applied to a communication connection between the electronic device and an external electronic device or a relationship between the electronic device and the external electronic device, to select at least one of the first communication network or the second communication network based on the authentication scheme or the relationship, and to perform tethering for the external electronic device such that the external electronic device accesses the at least one selected communication network through the electronic device.

In the electronic device according to an embodiment, the processor may be configured to verify the authentication scheme or the relationship in response to a connection request received from the external electronic device.

In the electronic device according to an embodiment, the processor may be configured to provide a UI for notifying a user of the electronic device of the at least one selected communication network.

In the electronic device according to an embodiment, the processor may be configured to select the second communication network if an authentication scheme applied to the communication connection is "public or open".

In the electronic device according to an embodiment, the processor may be configured to select the first communication network or the second communication network if a specified authentication scheme is applied to the communication connection.

In the electronic device according to an embodiment, the specified authentication scheme may include a MAC authentication scheme, WEP, WPA, WPA2-PSK, EAP, captive portal, or their combinations.

In the electronic device according to an embodiment, the processor may be configured to select the first communication network or the second communication network if the external electronic device has a specified relationship with the electronic device.

In the electronic device according to an embodiment, the processor may be configured to select the second communication network if the external electronic device does not have a specified relationship with the electronic device.

In the electronic device according to an embodiment, the first communication network may correspond to a cellular network, and the second communication network may correspond to a local-area wireless communication network.

A method for establishing a communication connection in an electronic device according to an embodiment of the present disclosure may include verifying properties of at least one communication network accessed by the electronic device, determining an authentication scheme to be applied to a communication connection between the electronic device and an external electronic device, based on the properties, and establishing the communication connection such that the external electronic device accesses the at least one communication network through the electronic device based on the authentication scheme.

In the method according to an embodiment, the properties may include an authentication scheme, a type, a charging policy, a data rate, or a network operator of the at least one communication network, or their combinations.

In the method according to an embodiment, the determining of the authentication scheme may include determining to apply a specified authentication scheme to the communication connection, if the at least one communication network corresponds to a cellular network.

In the method according to an embodiment, the determining of the authentication scheme may include determining to apply a second specified authentication scheme, corresponding to a first specified authentication scheme, to the communication connection, if the first specified authentication scheme is applied to the at least one communication network.

In the method according to an embodiment, the determining of the authentication scheme may include determining to set the authentication scheme of the communication connection to "public or open", if an authentication scheme of the at least one communication network is "public or open".

A method for establishing a communication connection in an electronic device according to an embodiment of the present disclosure may include verifying an authentication scheme applied to a communication connection between the electronic device and an external electronic device or a relationship between the electronic device and the external electronic device, selecting at least one of a first communication network or a second communication network based on the authentication scheme or the relationship, and performing tethering for the external electronic device such that the external electronic device accesses the at least one selected communication network through the electronic device.

In the method according to an embodiment, the selecting of the at least one of the first communication network or the second communication network may include selecting one of the first communication network and the second communication network or both of them, if a specified authentication scheme is applied to the communication connection.

In the method according to an embodiment, the selecting of the at least one of the first communication network or the second communication network may include selecting one of the first communication network and the second communication network or both of them, if the external electronic device has a specified relationship with the electronic device.

In the method according to an embodiment, the first communication network may correspond to a cellular network, and the second communication network may correspond to a local-area wireless communication network.

According to an embodiment of the present disclosure, a computer-readable recording medium stores instructions for, when executed by at least one processor, executing operations, the operations including verifying properties of at least one communication network accessed by an electronic device, determining an authentication scheme to be applied to a communication connection between the electronic device and an external electronic device, based on the properties, and establishing the communication connection such that the external electronic device accesses the at least one communication network through the electronic device based on the authentication scheme.

In the computer-readable recording medium according to an embodiment, the properties may include an authentication scheme, a type, a charging policy, a data rate, or a network operator of the at least one communication network, or their combinations.

In the computer-readable recording medium according to an embodiment, the determining of the authentication scheme may include determining to apply a specified authentication scheme to the communication connection, if the at least one communication network corresponds to a cellular network.

In the computer-readable recording medium according to an embodiment, the determining of the authentication scheme may include determining to apply a second specified authentication scheme, corresponding to a first specified authentication scheme, to the communication connection, if the first specified authentication scheme is applied to the at least one communication network.

In the computer-readable recording medium according to an embodiment, the determining of the authentication scheme may include determining to set the authentication scheme of the communication connection to "public or open", if an authentication scheme of the at least one communication network is "public or open".

According to an embodiment of the present disclosure, a computer-readable recording medium stores instructions for, when executed by at least one processor, executing operations, the operations including verifying an authentication scheme applied to a communication connection between an electronic device and an external electronic device or a relationship between the electronic device and the external electronic device, selecting at least one of the first communication network or the second communication network based on the authentication scheme or the relationship, and performing tethering for the external electronic device such that the external electronic device accesses the at least one selected communication network through the electronic device.

In the computer-readable recording medium according to an embodiment, the selecting of the at least one of the first communication network or the second communication network may include selecting one of the first communication network and the second communication network or both of them, if a specified authentication scheme is applied to the communication connection.

In the computer-readable recording medium according to an embodiment, the selecting of the at least one of the first communication network or the second communication network may include selecting one of the first communication network and the second communication network or both of them, if the external electronic device has a specified relationship with the electronic device.

In the computer-readable recording medium according to an embodiment, the first communication network may correspond to a cellular network, and the second communication network may correspond to a local-area wireless communication network.

According to various embodiments of the present disclosure, at least part of a device (e.g., modules or the functions) or a method (e.g., operations) may be implemented with, for example, instructions stored in computer-readable storage media which have a program module. When the instructions are executed by a processor (e.g., a processor 820 of FIG. 8), one or more processors may perform functions corresponding to the instructions. The computer-readable storage media may be, for example, a memory 830 of FIG. 8.

The computer-readable storage media may include a hard disc, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments disclosed in the present disclosure, the electronic device may determine an authentication scheme of a (tethering) communication connection based on properties of an accessed communication network. According to an embodiment, the electronic device may determine a communication network to be granted access to the external electronic device based on at least one of an authentication scheme of the communication connection or a relationship with the external electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user equipment (UE), comprising:
at least one communication module; and a processor operatively coupled to the at least one communication module,
wherein the processor is configured to:
through the at least one communication module, access to a communication network,
identify properties of the communication network accessed by the UE through the at least one communication module, wherein the properties comprise a type of the communication network, wherein the type of the communication network comprises a first communication network to which a charging policy is applied, and a second communication network to which the charging policy is not applied,
determine an authentication scheme to be applied to a communication connection between the UE and an external UE, based on the properties, and
establish, based on the authentication scheme, the communication connection such that the external UE accesses the communication network through the UE, and
wherein the processor is further configured to:
in response to determining that the type of the communication network is the first communication network, determine the authentication scheme as a WPA (Wi-Fi protected access) or a WPA2-preshared key (PSK), and
in response to determining that the type of the communication network is the second communication network, determine the authentication scheme as open.

2. The UE of claim 1, wherein the properties further comprise an authentication scheme of the communication network, a data rate of the communication network, or a network operator of the communication network, or any combination thereof.

3. The UE of claim 1, wherein the at least one communication module comprises:
a first communication module configured to access the second communication network; and
a second communication module configured to establish the communication connection between the external UE and the UE.

4. The UE of claim 3,
wherein the first communication module comprises a first wireless-fidelity (Wi-Fi) network controller, and
wherein the second communication module comprises a second Wi-Fi network controller.

5. A user equipment (UE), comprising:
at least one communication module; and
a processor operatively coupled to the at least one communication module,
wherein the processor is configured to:
identify an authentication scheme applied to a communication connection between the UE and an external UE,
select, based on the authentication scheme, a communication network among a first communication network to which a charging policy is applied, and a second communication network to which the charging policy is not applied,
through the at least one communication module, access the selected communication network, and
perform tethering for the external UE such that the external UE accesses the selected communication network through the UE, and
wherein the processor is further configured to:
in response to identifying that the authentication scheme is a WPA (Wi-Fi protected access) or a WPA2-preshared key (PSK), select the first communication network, and
in response to identifying that the authentication scheme is open, select the second communication network.

6. The UE of claim 5, wherein the processor is further configured to verify the authentication scheme in response to a connection request received from the external UE.

7. The UE of claim 5, wherein the processor is further configured to provide a user interface (UI) for notifying the first communication network and the second communication network.

8. The UE of claim 5,
wherein the first communication network corresponds to a cellular network, and
wherein the second communication network corresponds to a local-area wireless communication network.

9. A non-transitory computer-readable recording medium storing thereon instructions for, when executed by at least one processor, performing operations, the operations comprising:
accessing to a communication network;
identifying properties of the communication network accessed by a user equipment (UE), wherein the properties comprise a type of the communication network, wherein the type of the communication network comprises a first communication network to which a charging policy is applied, and a second communication network to which the charging policy is not applied;
determining an authentication scheme to be applied to a communication connection between the UE and an external UE, based on the properties; and
establishing, based on the authentication scheme, the communication connection such that the external UE accesses the communication network through the UE,
wherein determining of the authentication scheme comprises:
in response to determining that the type of the communication network is the first communication network, determining the authentication scheme as a WPA (Wi-Fi protected access) or a WPA2-preshared key (PSK), and
in response to determining that the type of the communication network is the second communication network, determining the authentication scheme as open.

* * * * *